US008112594B2

(12) United States Patent
Giacomoni et al.

(10) Patent No.: US 8,112,594 B2
(45) Date of Patent: Feb. 7, 2012

(54) EFFICIENT POINT-TO-POINT ENQUEUE AND DEQUEUE COMMUNICATIONS

(75) Inventors: John Giacomoni, Longmont, CO (US); Manish Vachharajani, Lafayette, CO (US)

(73) Assignee: The Regents of the University of Colorado, Denver, CO (US)

( * ) Notice: Subject to any disclaimer, the term of this patent is extended or adjusted under 35 U.S.C. 154(b) by 961 days.

(21) Appl. No.: 12/106,712

(22) Filed: Apr. 21, 2008

(65) Prior Publication Data

US 2008/0276056 A1     Nov. 6, 2008

Related U.S. Application Data

(60) Provisional application No. 60/912,979, filed on Apr. 20, 2007.

(51) Int. Cl.
*G06F 12/00* (2006.01)
(52) U.S. Cl. ...................................................... 711/154
(58) Field of Classification Search ........................ None
See application file for complete search history.

(56) References Cited

U.S. PATENT DOCUMENTS

| | | | |
|---|---|---|---|
| 6,675,218 B1 | 1/2004 | Mahler et al. | |
| 7,581,172 B2 * | 8/2009 | Ozzie et al. | 715/234 |
| 2005/0021898 A1 * | 1/2005 | Alverson et al. | 711/1 |
| 2008/0276056 A1 * | 11/2008 | Giacomoni et al. | 711/159 |
| 2010/0100673 A1 * | 4/2010 | Cheriton | 711/108 |

OTHER PUBLICATIONS

Non-final Office Action dated Jan. 5, 2011, 16 pp., U.S. Appl. No. 12/106,684, USPTO.
Non-final Office Action dated Jun. 21, 2011, 15 pp., U.S. Appl. No. 12/106,684, USPTO.

* cited by examiner

*Primary Examiner* — Brian Peugh
(74) *Attorney, Agent, or Firm* — Holland & Hart LLP

(57) ABSTRACT

Systems and methods for writing and/or reading data to a point-to-point shared memory communication mechanism are provided according to embodiments disclosed herein. According to one embodiment, a determination may be made whether a first memory location in the cache of a general purpose multi-core processor includes an empty symbol. If the first memory location includes the empty symbol, then data may be placed in the first memory location in the cache. If the first memory location does not include the empty symbol, then waiting until it does. In another embodiment, a determination may be made whether a first memory location of a general purpose multi-core processor includes the empty symbol. If it does not, then data may be read from the first memory location and/or the empty symbol may be written into the first memory location. If the first memory location does include the empty symbol, then pausing.

21 Claims, 26 Drawing Sheets

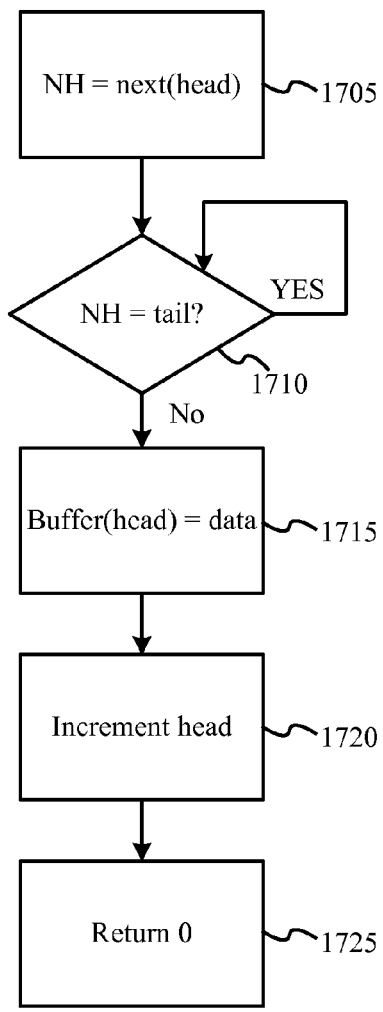
FIG. 17A
(Prior Art)
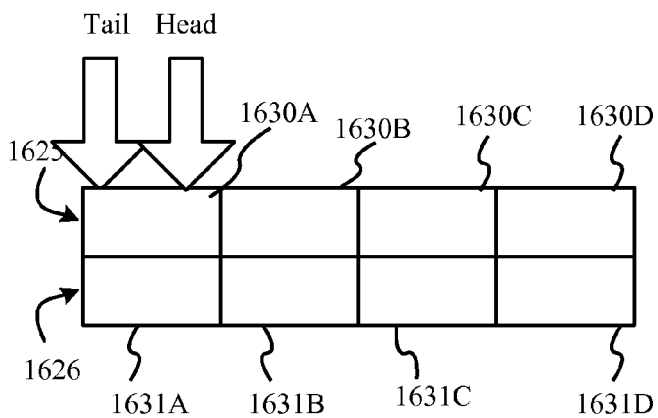
(Prior Art) FIG. 17B
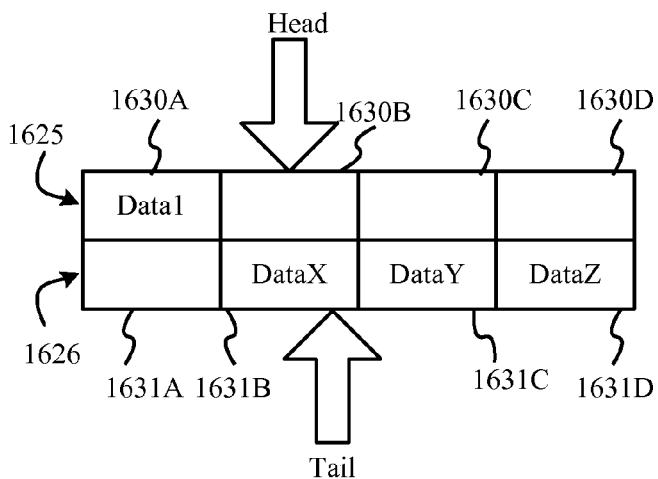
(Prior Art) FIG. 17C
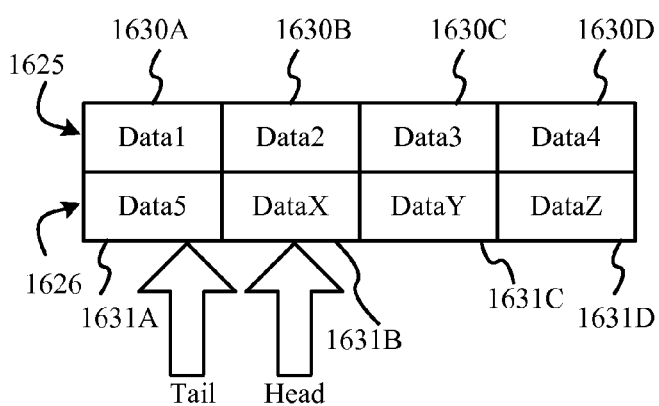
(Prior Art) FIG. 17D

EFFICIENT POINT-TO-POINT ENQUEUE AND DEQUEUE COMMUNICATIONS

CROSS-REFERENCE TO RELATED APPLICATIONS

This application is a non-provisional, and claims the benefit, of U.S. Provisional Application No. 60/912,979, filed Apr. 20, 2007, entitled "Efficient Pipeline Parallelism," the entirety of which is herein incorporated by reference for all purposes.

STATEMENT AS TO RIGHTS TO INVENTIONS MADE UNDER FEDERALLY SPONSORED RESEARCH AND DEVELOPMENT

This invention was made with Government support under grant no. DAAD19-01-1-0484 awarded by the U.S. army Research Office. The Government has certain rights in the invention.

BACKGROUND

Designers have turned to fully custom processing engines to increase processing rates. Recently, however, designers have shifted to special purpose programmable platforms (e.g., network processors). This shift has dramatically reduced both the cost and time needed to develop a system. Unfortunately, these special purpose platforms typically expose excessive low level platform-specific implementation details that developers must properly manage to achieve full performance. For example, network processors typically scale the memory wall and achieve the performance constraints imposed by modern networks by exposing their architecture to the developers. Exposed elements have included processor interconnections, explicitly managed memory hierarchies, and lightweight threading. Thus, developers are forced to forgo the niceties of general purpose languages and traditional operating system support. These details complicate application development and harm portability by coupling the software to a specific platform.

SUMMARY

A method for enqueuing data is provided according to another embodiment. The method includes determining whether a first memory location associated with a general purpose multi-core processor includes an empty symbol, for example, "NULL." If the first memory location includes the empty symbol then data is placed in the first memory location. If the first memory location does not include the empty symbol the method is paused The pause may include, for example, waiting until the first memory location includes the empty symbol, returning and notifying an invoking method, and/or sleeping on a condition variable until notified. The method, in some embodiments may also include determining whether a second memory location includes the empty symbol; and placing data in the second memory location if the second memory location includes the empty symbol.

A method for dequeuing data is provided according to another embodiment. A determination is made whether a first memory location of a general purpose multi-core processor includes the empty symbol, for example, "NULL." If the first memory location does not include the empty symbol, then data is read from the memory location. If the first memory location does not include the empty symbol then the empty symbol is placed in the first memory location. If the first memory location does include the empty symbol then pausing. In some embodiments the method may also include determining whether a second memory location includes the empty symbol. If the second memory location does not include the empty symbol, then reading data from the second memory location and placing the empty symbol in the second memory location.

Another method for enqueuing data is provided according to another embodiment. A head pointer is pointed to the oldest empty memory location in the set of the most recent entries where data was enqueued in a general purpose multi-core processor. A tail pointer is pointed to the oldest memory location in the set of the most recent entries where data was enqueued. A determination is made whether the memory location pointed to by the head pointer is empty. If the memory location pointed to by the head pointer is empty, then data may be placed in the memory location pointed to by the head pointer and the head pointer is incremented. In some embodiments, the head pointer may be stored in a memory location in a first cache line of the general purpose multi-core processor. In some embodiments the tail pointer is stored in a memory location in a second cache line. In some embodiments the first cache line and the second cache line comprise different cache lines. In yet other embodiments the distance between the head pointer and the tail pointer is calculated. A determination is made whether the distance between the head pointer and the tail pointer is less than an offset. If the distance between the head pointer and the tail pointer is less than the offset, then pausing at least one of dequeue and enqueue. If the distance between the head pointer and the tail pointer is less than the offset then waiting a period of time.

Another method for dequeuing data is provided according to another embodiment. A head pointer is pointed to the oldest empty memory location in the set of the most recent entries where data was enqueued in a general purpose multi-core processor. A tail pointer is pointed to the oldest memory location in the set of the most recent entries where data was enqueued. A determination is made whether the memory location pointed to by tail pointer is empty. If the memory location pointed to by the tail pointer is not empty, then data pointed to by the tail pointer is read. The memory location pointed to by the tail pointer is set equal to the empty symbol and the tail pointer is incremented.

A computer system is provided according to one embodiment that includes a general purpose multi-core processor coupled with memory and at least one network interface device. The general purpose multi-core processor may include a plurality of processing cores. The memory may include instructions to allocate a shared memory portion of the memory that is accessible from more than one context of execution. The memory may also include instructions to process a frame in a plurality of processing stages processed by a context of execution. In some embodiments, instructions may be included which bind and/or pin each of the plurality of processing stages is to a processing core of the multi-core processor. Instructions may also be included to connect one or more processing stages with a point-to-point communication mechanism that operates in shared memory.

A method for establishing parallel frame processing is also provided according to one embodiment. A plurality of frames is received at a general purpose multi-core processor that operates contexts of execution. Frame processing may be segmented into a plurality of stages. Each of the plurality of stages may be associated with a processing core corresponding to a processing core of the general purpose multi-core processor. Some stages may then be associated with a pointto-point communication mechanism that uses shared memory to communicate data between at least two stages.

A method for sequentially processing a plurality of frames is also proved according to one embodiment. Shared memory is allocated in a general purpose multi-core processor that operates contexts of execution. In some embodiments, the shared memory may be accessible by multiple contexts of execution. A first frame may be received at the general purpose multi-core processor and placed in shared memory. The first frame may be processed with a first processing core of the general purpose multi-core processor during a first time period. A second frame may be received at the general purpose multi-core processor after the first frame is received and placed in shared memory. The first frame may be processed with the second processing core during a second time period that occurs after the first time period. The second frame may be processed with the first processing core during the second time period.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE FIGURES

FIG. 17A shows a flowchart depicting a method for enqueuing data into a buffer using a head and a tail pointer according to one embodiment.

FIGS. 17B-17D show the operation of a head and a tail pointer on two cache lines according to one embodiment.

DESCRIPTION

Figure 1A:
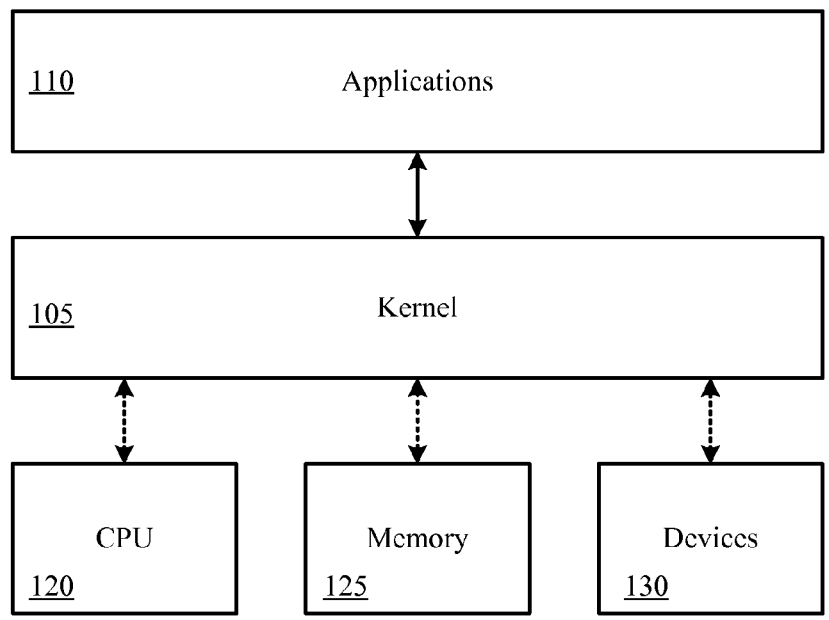
FIG. 1A shows a block diagram of a typical interaction between an application, a kernel and physical devices.

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

As used throughout this disclosure, the term "general purpose processor" includes a processor that runs arbitrary applications. A "general purpose processor" may also include a processor that operates with virtual memory. Moreover, a "general purpose processor" may also include a processor that is not supported by specific hardware or devices.

As used throughout this disclosure, the term "context of execution" includes a process, thread or a schedulable unit, or any combination thereof. Moreover, a "context of execution" may operate in user space, kernel space, or any other operating space.

As used throughout this disclosure, the term "virtual memory" includes memory that gives an application, program, or context of execution the impression that it has contiguous working memory, while in fact it is physically fragmented and may even overflow on to disk storage. That is, "virtual memory" is based on tricking programs into thinking they are using large blocks of contiguous physical memory. Virtual memory is often divided into user space and kernel space.

As used throughout this disclosure, the term "kernel" includes the central component of a computer operating systems operating on a general purpose processor. Its responsibilities may include managing the system's resources and/or the communication between hardware and software components. A kernel may provide the lowest-level abstraction layer for the resources (such as: memory, processors and I/O devices) that application software must control to perform its function. The kernel may make these facilities available to application processes through inter-process communication mechanisms and system calls.

As used throughout this disclosure, the term "kernel space" includes memory that may be used for running the kernel, kernel extensions, and/or some device drivers. In general purpose processors, kernel space is not accessible by user applications. In most operating systems and in all operating systems operating on a general purpose processor kernel memory is almost never swapped out to disk.

As used throughout this disclosure, the term "user space" includes memory where most user mode applications work. User space memory can be swapped out to a disk when necessary. User space memory is set up by the kernel for operating a user's context of execution, process, thread and/or application.

As used throughout this disclosure, the term "pinning" and/or "binding" (as well as "pin," "bind" and "bound") include that act of requiring a context of execution on to run on a specific processor, processing core, or portion of a processor. This act may occur through the scheduler. The terms are used synonymously throughout the disclosure. The terms may also refer to hard binding, which turns off the scheduler, and/or hard affinity, which gives the scheduler hints regarding where to process a context of execution.

FIG. 1A shows how a kernel 105 acts as an intermediary between applications 110 and hardware, such as a CPU 120 or processors, memory 125, and/or devices 130. The kernel 105 may also manage the hardware resources.

Figure 1B:
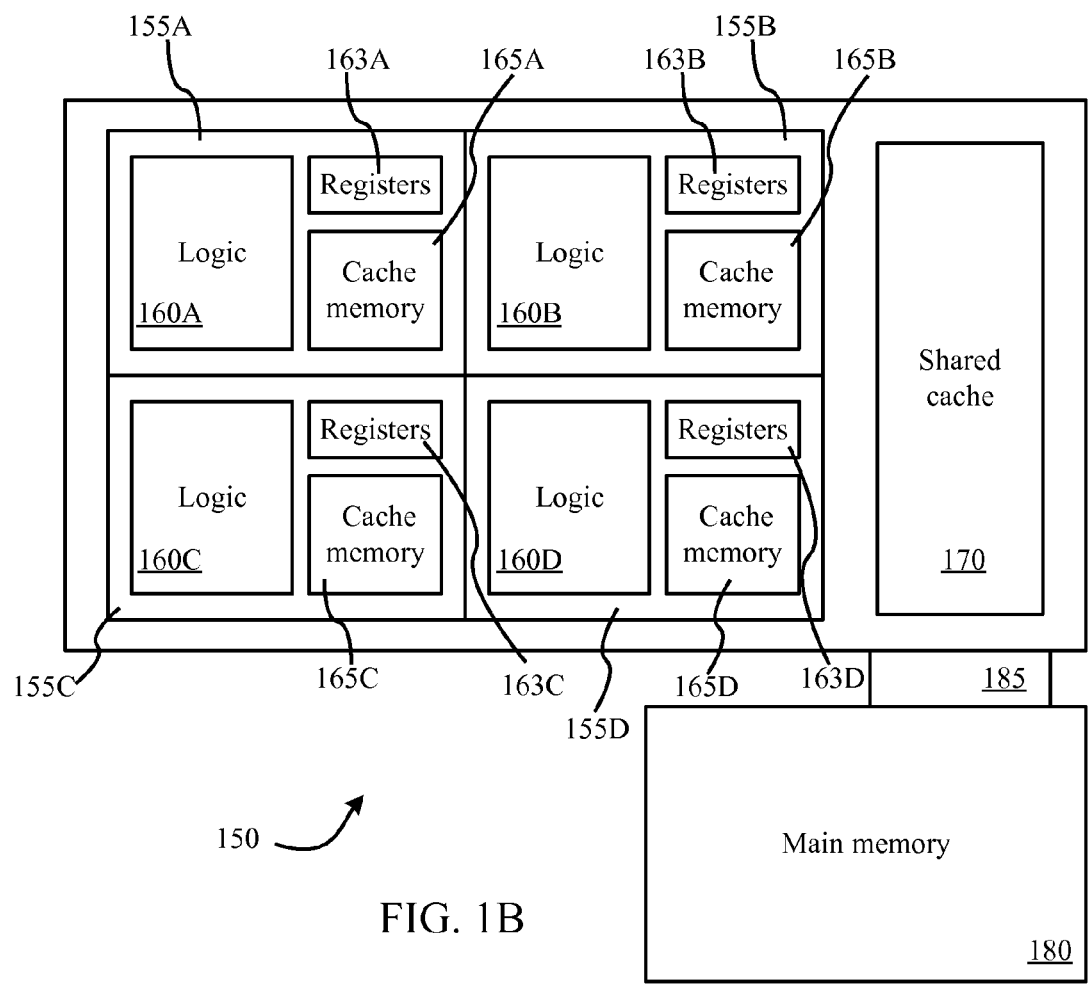
FIG. 1B shows a block diagram of one example of a general purpose multi-core processor that may be used by embodiments.

As used throughout this disclosure, the term "multi-core processor" includes a processor that combines two or more independent processing cores. The independent processing cores, in some embodiments, may be included in a single package. A processing core may refer to an independent processing unit. For example, a dual-core processor is a multi-core processor operating with two independent processing cores. FIG. 1B shows an example of a quad-core multi-core processor 150. The multi-core processor 150 includes four processing cores 155. Each processing core includes a logic unit 160, a register 163 and cache memory 165. Some multi-core processors 150 include a shared cache 170. The multi-core processor may be coupled with main memory 180 through an interconnect 185. According to another embodiment, a multi-core processors may be implemented with shared functional units. For example, Intel's Hyper-Threading technology allows an Intel Pentium-4 core to be treated as two logically distinct cores. In yet another embodiment, a multi-core processor may include a multi-threaded core that has multiple instructional fetch units and/or shares functional units, such as Symmetric Multi-Threading. In such embodiments, while the processor may include a single processor, the operating system "sees" multiple cores.

As used throughout this disclosure, the term "pointer" includes a value that refers directly or indirectly to another value stored elsewhere in memory using the memory address of the other value. A pointer may also refer to any data structure, buffer entry, data element, etc., that refers to another value stored elsewhere. A pointer may include the memory address of another value, and a context of execution may dereference the pointer to return the value. A pointer may include an index value. The index value specifies a number of memory locations beyond a base memory location where the data of interest may be found. For example, the pointer may include the number 7 as an index. Therefore, in this example, the pointer refers to the data stored in the 7th memory location from a base value.

A multi-core processor may be any type of processor, such as, for example, Pentium processors like the Intel Xeon or a similar processor. For example, the processors may also be two, four, eight, sixteen, thirty two or more processors combined in a single processing core, such as, for example, a dual-core or quad-core Pentium Xeon processor.

Embodiments of the present invention provide for high throughput data processing. Such embodiments may allow for data processing at frame rate. Moreover, some embodiments of the invention may provide instructions, software, application programming interface, methods and/or processes that operate on a general purpose multi-core processor.

Another embodiment provides for a multi-core processor that allocates a shared memory region accessible by both user space and kernel space. In such an embodiment, the shared memory space may be used to transfer frame data between stages, such as using a point-to-point communication device. For example, frame processing may require an input stage in kernel space, an application stage in user space, and/or an output stage in kernel space. The application stage may be decomposed into any number of applications or substages. The application may perform processing work on the frame data or perform processing work in response to the frame data. Each of these stages may be pinned to a single processing core of a general purpose multi-core processor. The shared memory space may be used to transfer the data from the input process to the application process and/or from the application process to the output process. The shared memory, according to this embodiment, therefore, should permit fast data sharing between the kernel and user space.

Another embodiment provides for enqueuing data into a shared memory buffer using a single pointer and dequeuing data from the shared memory buffer using a different pointer. Such an embodiment may permit one application to independently write to the buffer and permit another application to independently read from the buffer. For example, a head pointer may be used to point to the oldest memory location where data was written and a tail pointer may be used to point to the oldest memory location where data was read. The two applications may not, or rarely, communicate with each other regarding the status of the data being read or written from the buffer, such as sharing information regarding the head and tail pointers. If the memory location pointed to by the head pointer is empty, as signified by an empty symbol, then data may be written into the memory location. The head pointer may then be incremented. If the memory location is not empty, however, then data is not written into the buffer until the memory location is empty. If the memory location pointed to by the tail pointer is not empty then data may be read from the buffer. If the memory location is empty, then data is not read from the memory location until the memory location is written to. Thus, according to embodiments, writing data to a memory location may occur independent from the tail pointer; likewise, reading data from a memory location may occur independent from the head pointer.

Figure 2A:
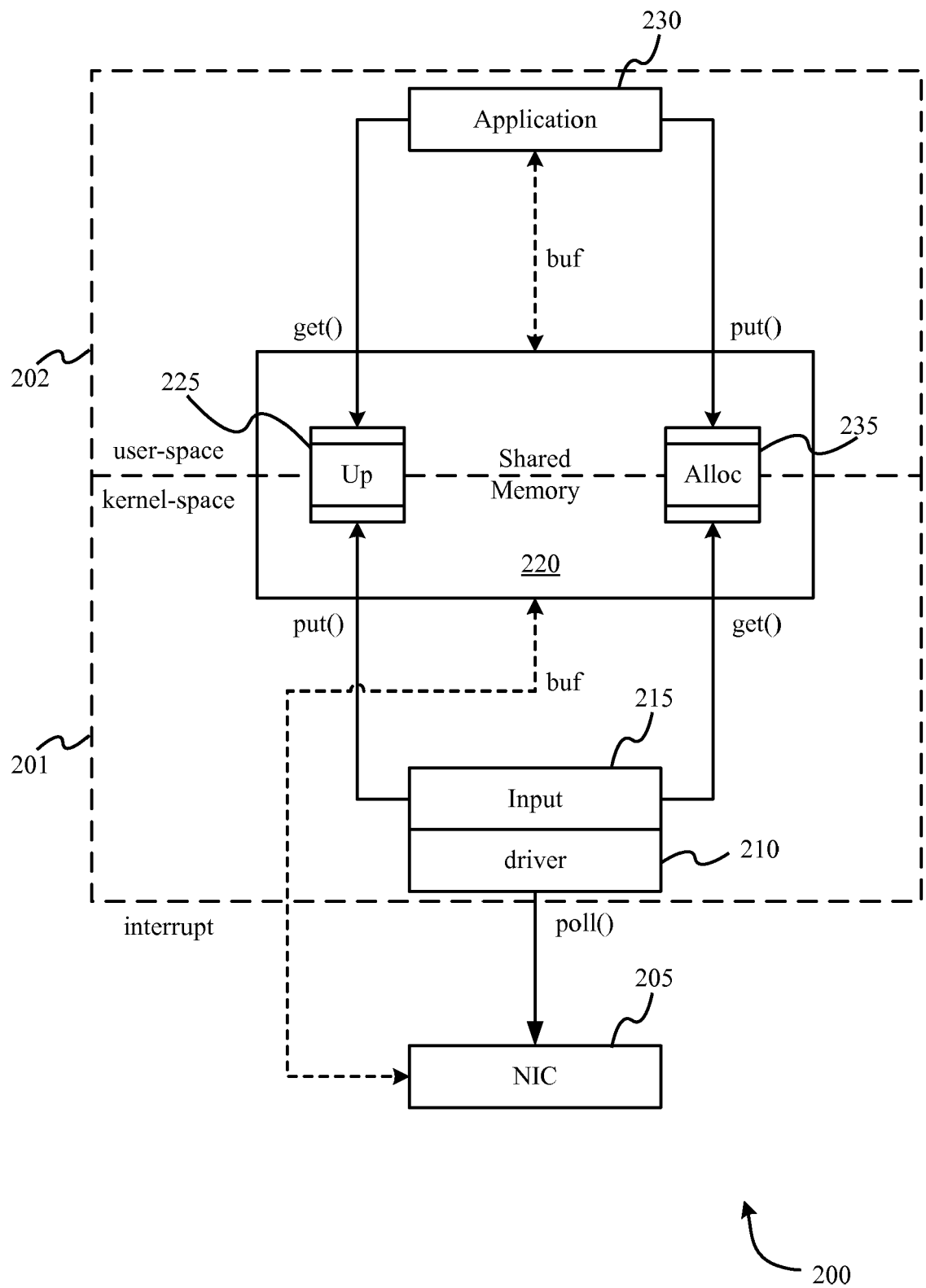
FIG. 2A shows a block diagram of a two staged frame processing system according to one embodiment.

FIG. 2A shows a block diagram 200 of a two staged frame processing system according to one embodiment. The two stages in this embodiment are input 215 and application 230. In any of the embodiments, the application stage may perform any type of application on and/or with the frame data without limitation. Frame data is received from the network through the network interface controller (NIC) 205. The NIC 205 is controlled by a device driver 210 running in kernel space 201. A shared memory region 220 provides memory accessible by the application 230 running in user space 202 and the input stage 215 running in kernel space 201. The shared memory region may also include an up queue 225 and an allocation queue 235. The up queue 225 provides a point-to-point communication mechanism between the input stage 215 and the application stage 230. As data is received at the NIC 205, the input 215 requests shared memory addresses from the allocation queue 235 where the data may be stored in shared memory space 220. The input stage 215 may then tell the NIC 205 through the driver 210 the address locations where the data may be stored in shared memory 220. The NIC may then write the frame data into shared memory 220. The input 225 may then place the address for the data received from the network and stored in shared memory 220 in the up queue 225.

The application stage 230 may then pull the frame data from the shared memory 220 using the pointers stored in the up queue 225. Any data application may occur in the application stage 230 without limitation. Once the application stage 230 has completed its processing, the addresses associated with data that has been processed is then returned to the allocation queue 235. As frames are received from the network, they are first processed by the input stage 215 and then the application stage 230. Because the processing has been segmented, in some embodiments, one frame may be processed in the input stage while another frame is being processed in the application stage. These two stages may be operating on different processing cores of a multi-core processor.

Figure 2B:
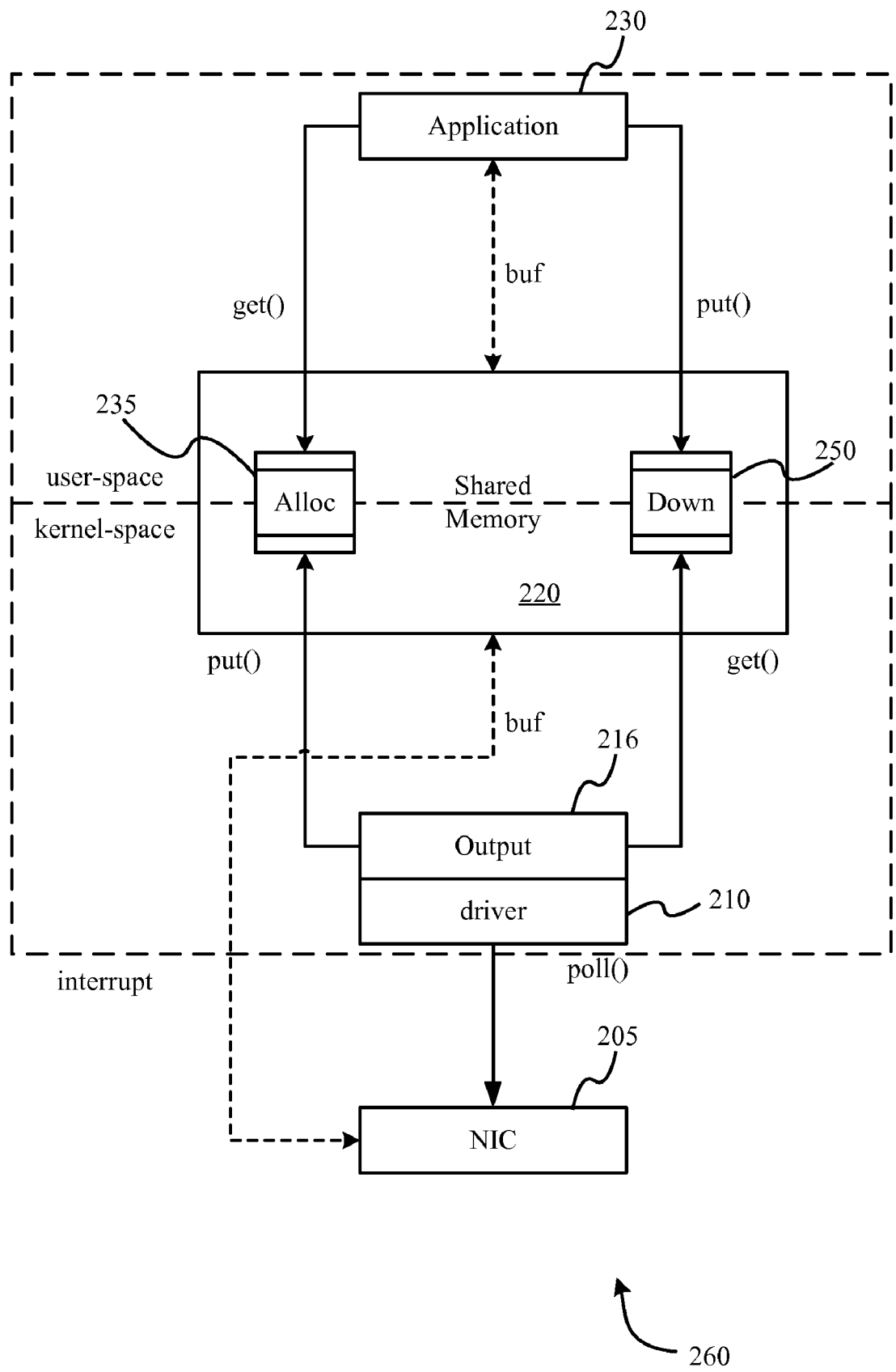
FIG. 2B shows another block diagram of a two staged frame processing system according to one embodiment.

FIG. 2B shows a block diagram 260 of a two staged frame generation system 200 according to another embodiment. The two stages in this embodiment, are application 230 and output 216. As frame data is created in the application stage 230, the allocation queue 235 may provide the addresses of shared memory 220 locations where the frames may be transferred to the output stage 216. These addresses may be placed in the down queue 250, which may then be accessed by the output stage 216. The output stage 216 may read the address of frame data that may be sent in the network from the down queue 250. Through the device driver 210, the output stage 216 may then tell the NIC 205 where to retrieve the data in the shared memory 220 and send the data on the network. Because the processing has been segmented, in some embodiments, one frame may be processed in the application stage while another frame is being processed in the output stage. These two stages may be operating on different processing cores of a multi-core processor.

Figure 2C:
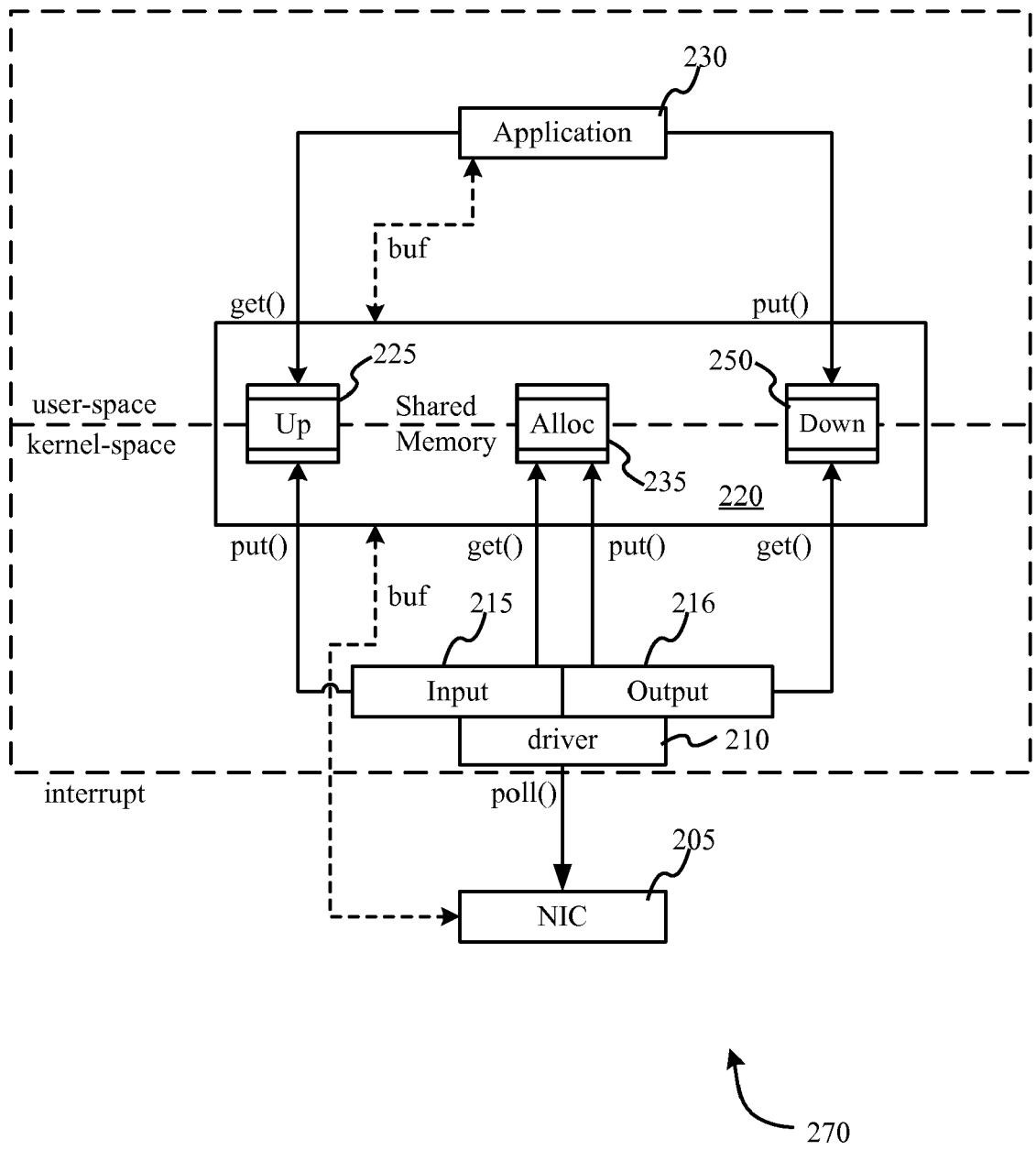
FIG. 2C shows a block diagram of a three staged frame processing system according to one embodiment.

FIG. 2C shows a block diagram 270 of a three staged frame generation system according to another embodiment. The three stages in this embodiment are input 215, application 230, and output 216. As described in conjunction with FIG. 2A, the input stage 215 provides allocated shared memory addresses from the allocation queue 235 to the NIC 205. These shared memory addresses are then placed in the up queue 225. The application stage 230 may then access the data associated with the memory addresses placed in the up queue 225. The application stage 230 may perform some function on and/or with the data and then place the memory addresses in the down queue 250 when application processing is complete. The output stage 216 may then provide the memory addresses from the down queue 250 to the NIC 205 through the device driver 210. The NIC may then send the data on the network. The three stage process may be used, for example, as a network filter, a network copier, network monitor, etc.

In FIGS. 2A-2C, the up queue and the down queue may be a point-to-point communication mechanism. Various embodiments described herein may also be used for the for the up queue and/or the down queue. Moreover, other queuing and/or dequeuing techniques may be used such as Lamport's enqueue and dequeue.

Figure 3A:
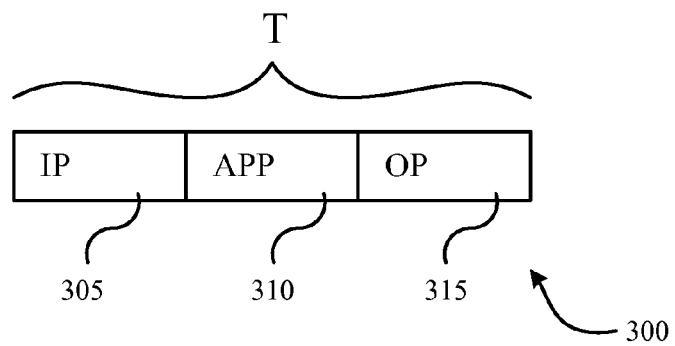
FIG. 3A shows a three stage data frame process.
Figure 3B:
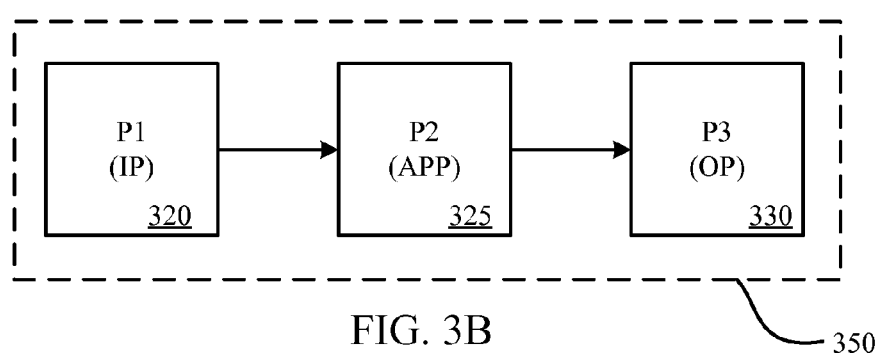
FIG. 3B shows the three stage data frame process of FIG. 3A pinned to three processing cores of a general purpose multi-core processor according to one embodiment.
Figure 3C:
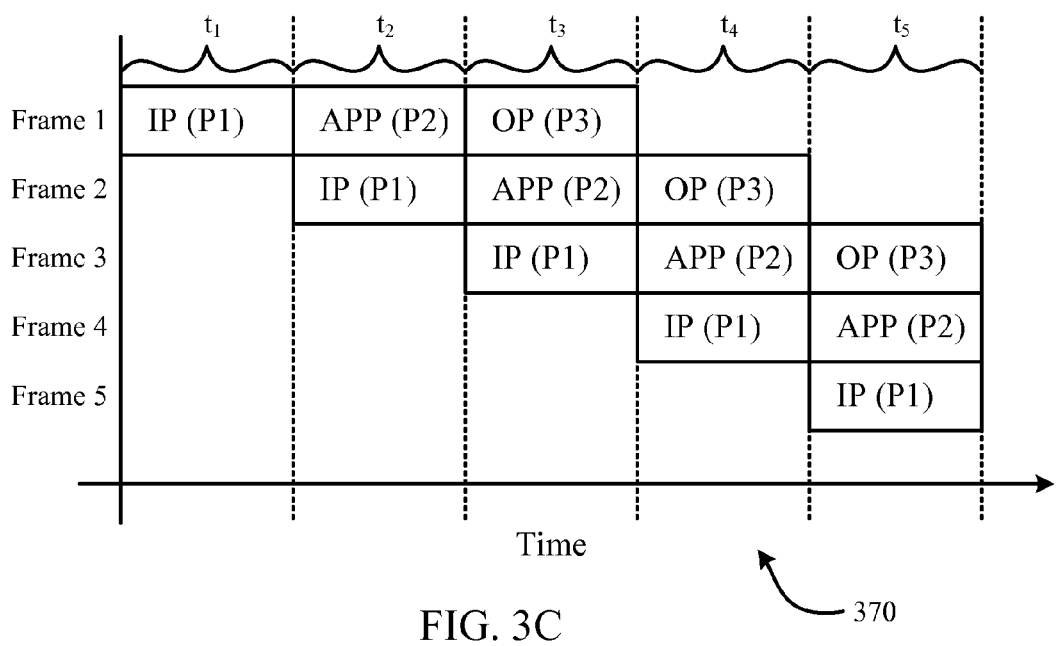
FIG. 3C shows a timing diagram of the three stage data frame process operating on multiple frames over time according to one embodiment.

FIG. 3A shows a three stage data frame process 300 according to one embodiment of the invention. A data frame may require input processing 305, application processing 310, output processing 315. The entire process occurs over a time period, T. Each of the three stages of the data frame process 300 may occur on a separate processing core (or processor) of a multi-core processor 350 as shown in FIG. 3B. Accordingly, processor 1 (P1) 320 may process the input stage, processor 2 (P2) 325 may process the application stage, and processor 3 (P2) 330 may process the output stage. By segmenting frame processing into three stages and pinning the processing to an independent processing core of a multi-core processor, multiple stages may be processed in parallel as shown in timing chart 370 in FIG. 3C. In an ideal case, each stage of the process takes approximately T/3 to complete.

The input stage of Frame 1 is processed during the first time period $t_1$ on processor P1. During the second time period $t_2$, the application stage of Frame 1 is processed on processor P2 and the input stage of Frame 2 is processed on processor P1. During the third time period $t_3$, the output stage of Frame 1 is processed on processor P3, the application stage of Frame 2 is processed on processor P2, and the input stage of Frame 3 is processed on processor P1. During the fourth time period $t_4$, the output stage of Frame 2 is processed on processor P3, the application stage of Frame 3 is processed on processor P2, and the input stage of Frame 4 is processed on processor P1. During the fifth time period $t_5$, the output stage of Frame 3 is processed on processor P3, the application stage of Frame 4 is processed on processor P2, and the input stage of Frame 5 is processed on processor P1.

Figure 4A:
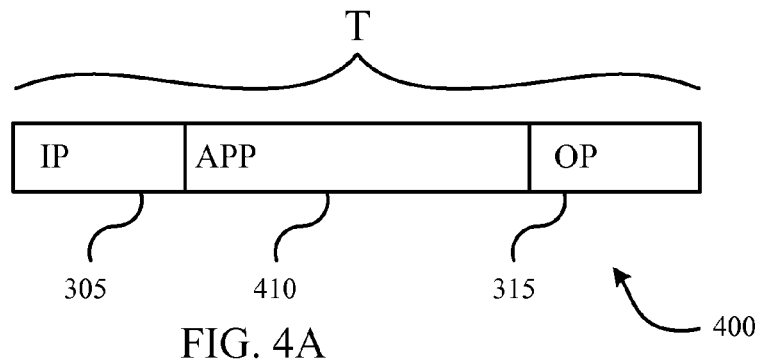
FIG. 4A shows a three stage data frame process.
Figure 4B:
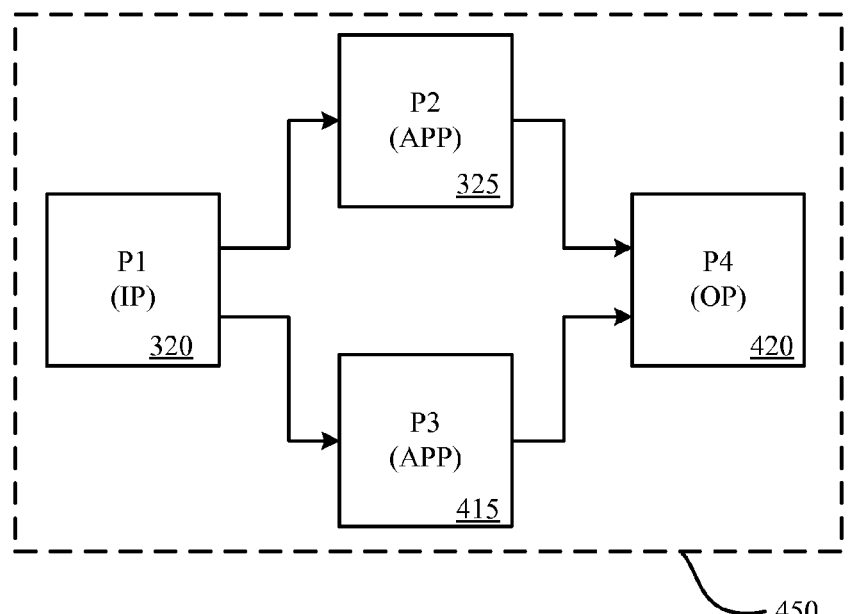
FIG. 4B shows the three stage data frame process of FIG. 4A pinned to four processing cores of a general purpose multi-core processor according to one embodiment.

FIG. 4A shows another three stage data frame process 400 according to one embodiment of the invention. According to this embodiment, a data frame may require input processing 305, application processing 310, output processing 315. The entire process occurs over a time period, T. In this embodiment, the application stage 410 requires twice the processing time of the input stage 305 or the output stage 310. Each of the three stages of the data frame process 400 may occur on a separate processing core (or processor) of a multi-core processor 450 as shown in FIG. 4B. The application stage 410 may alternate between two processors. Accordingly, processor 1 (P1) 320 may process the input stage, processor 2 (P2) 325 and processor 3 (P3) 415 may process the application stage of alternating frames, and processor 4 (P4) 420 may process the output stage. By segmenting frame processing into three stages and pinning the processing to an independent processing core of a multi-core processor, multiple stages may be processed in parallel as shown in timing chart 470 in FIG. 4C. In an ideal case, each stage of the process takes approximately T/4 to complete.

Figure 4C:
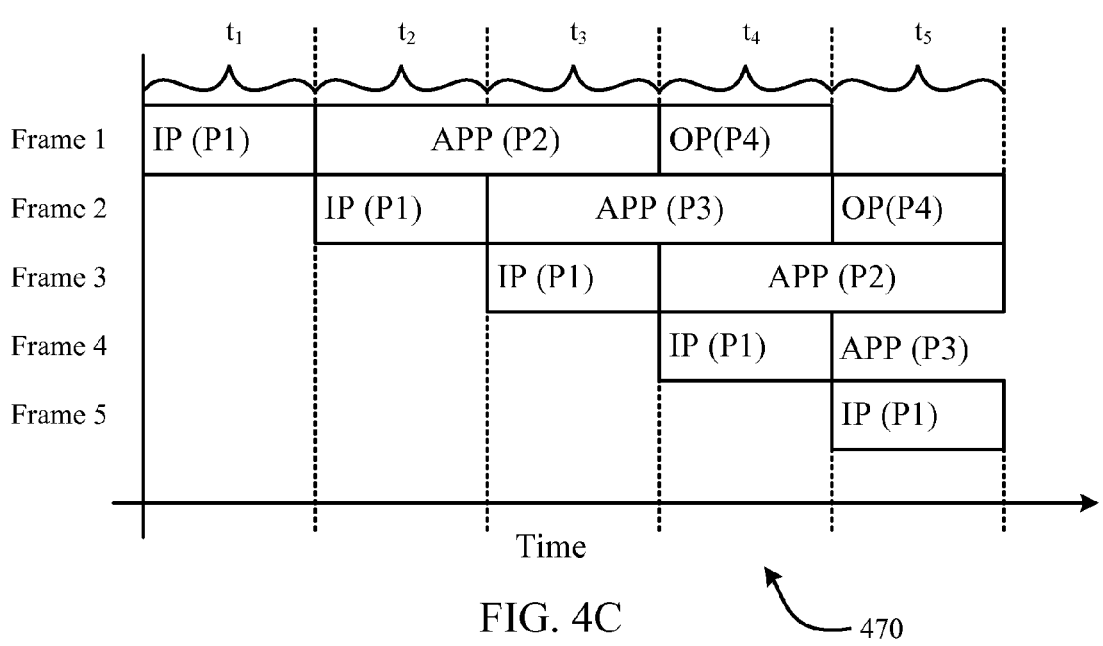
FIG. 4C shows a timing diagram of the three stage data frame process operating on multiple frames over time according to one embodiment.

As shown in FIG. 4C, the input stage of Frame 1 is processed during the first time period $t_1$ on processor P1. During the second time period $t_2$, the first half of the application stage of Frame 1 is processed on processor P2 and the input stage of Frame 2 is processed on processor P1. During the third time period $t_3$, the second half of the application stage of Frame 1 is processed on processor P2, the first half of the application stage of Frame 2 is processed on processor P3, and the input stage of Frame 3 is processed on processor P1. During the fourth time period $t_4$, the output stage of Frame 2 is processed on processor P4, the second half of the application stage of Frame 2 is processed on processor P2, the first half of the application stage of Frame 3 is processed on processor P3, and the input stage of Frame 4 is processed on processor P1. During the fifth time period $t_5$, the output stage of Frame 3 is processed on processor P4, the second half of the application stage of Frame 2 is processed on processor P3, the first half of the application stage of Frame 3 is processed on processor P2, and the input stage of Frame 5 is processed on processor P1.

Figure 5A:
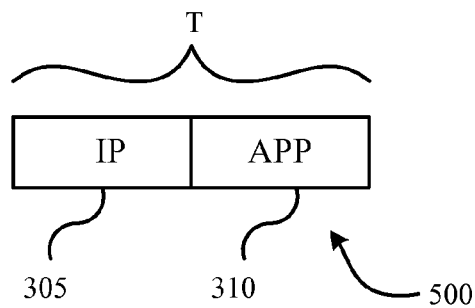
FIG. 5A shows a two stage data frame process.
Figure 5B:
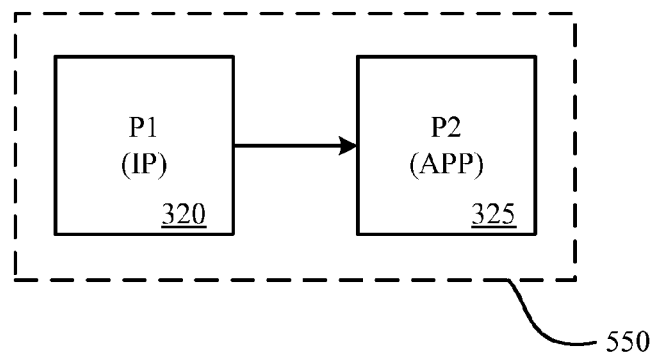
FIG. 5B shows the two stage data frame process of FIG. 5A pinned to two processing cores of a general purpose multi-core processor according to one embodiment.

FIG. 5A shows a two stage data frame process 500 according to one embodiment of the invention. According to this embodiment, a data frame may require input processing 305 and application processing 310. The entire process occurs over a time period, T. Each of the two stages of the data frame process 500 may occur on a separate processing core (or processor) of a multi-core processor 550 as shown in FIG. 5B. Accordingly, processor 1 (P1) 320 may process the input stage and processor 2 (P2) 325 may process the application stage. By segmenting frame processing into two stages and pinning the processing to independent processing cores of a multi-core processor, multiple stages may be processed in parallel as shown in timing chart 570 in FIG. 5C. In an ideal case, each stage of the process takes approximately T/2 to complete.

Figure 5C:
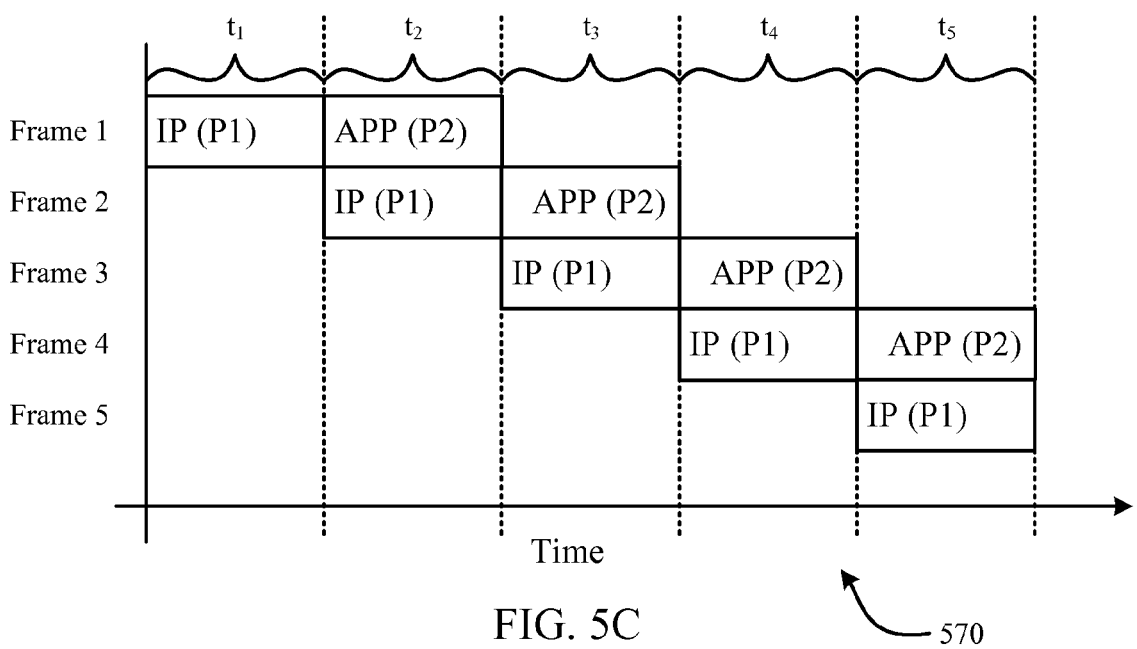
FIG. 5C shows a timing diagram of the two stage data frame process operating on multiple frames over time according to one embodiment.

As shown in FIG. 5C, the input stage of Frame 1 is processed during the first time period $t_1$ on processor P1. During the second time period $t_2$, the application stage of Frame 1 is processed on processor P2 and the input stage of Frame 2 is processed on processor P1. During the third time period $t_3$, the application stage of Frame 2 is processed on processor P2 and the input stage of Frame 3 is processed on processor P1. During the fourth time period $t_4$ the application stage of Frame 3 is processed on processor P2 and the input stage of Frame 4 is processed on processor P1. During the fifth time period $t_5$, the application stage of Frame 4 is processed on processor P2 and the input stage of Frame 5 is processed on processor P1.

Figure 6A:
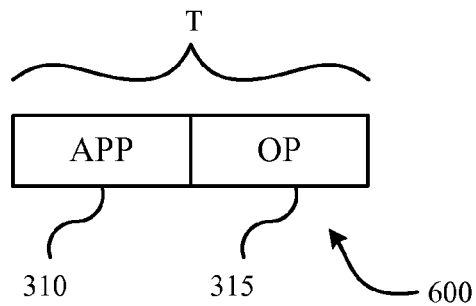
FIG. 6A shows a two stage data frame process.
Figure 6B:
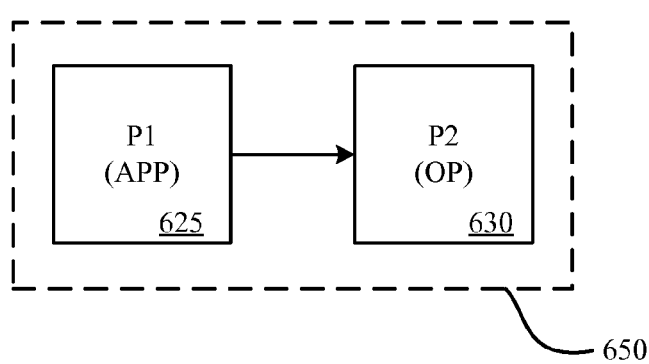
FIG. 6B shows the two stage data frame process of FIG. 6A pinned to two processing cores of a general purpose multi-core processor according to one embodiment.

FIG. 6A shows a two stage data frame generation process 600 according to one embodiment of the invention. According to this embodiment, a data frame may require application processing 310 and output processing 315. The entire process occurs over a time period, T. Each of the two stages of the data frame process 500 may occur on a separate processing core (or processor) of a multi-core processor 650 as shown in FIG. 6B. Accordingly, processor 1 (P1) 625 may process the application stage and processor 2 (P2) 630 may process the output stage. By segmenting frame processing into two stages and pinning the processing to independent processing cores of a multi-core processor, multiple stages may be processed in parallel as shown in timing chart 670 in FIG. 6C. In an ideal case, each stage of the process takes approximately T/2 to complete.

Figure 6C:
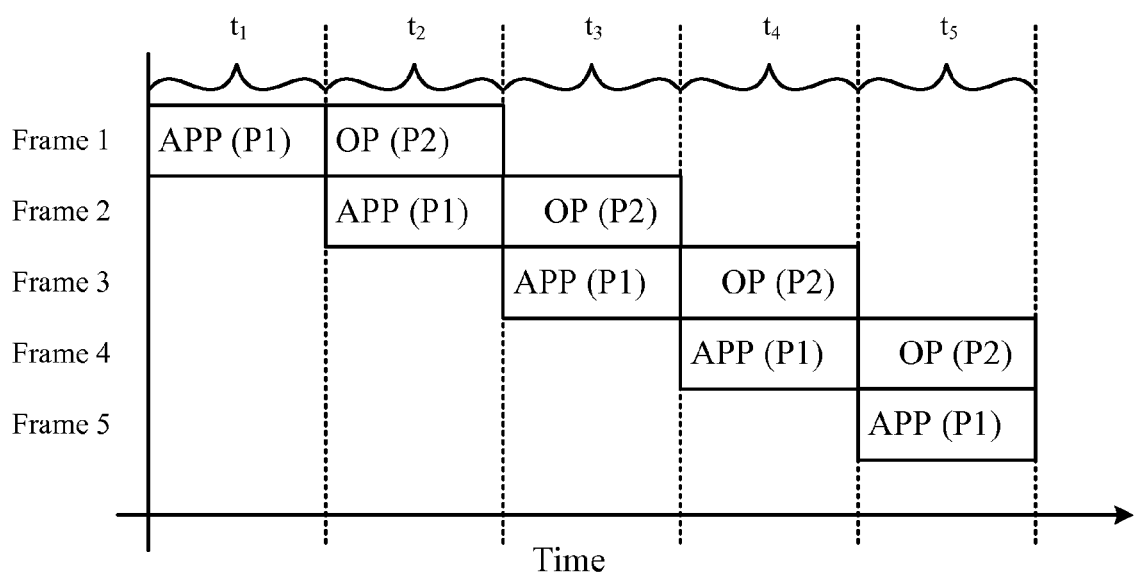
FIG. 6C shows a timing diagram of the two stage data frame process operating on multiple frames over time according to one embodiment.

As shown in FIG. 6C, the application stage of Frame 1 is processed during the first time period $t_1$ on processor P1. During the second time period $t_2$, the output stage of Frame 1 is processed on processor P2 and the application stage of Frame 2 is processed on processor P1. During the third time period $t_3$, the output stage of Frame 2 is processed on processor P2 and the application stage of Frame 3 is processed on processor P1. During the fourth time period $t_4$, the output stage of Frame 3 is processed on processor P2 and the application stage of Frame 4 is processed on processor P1. During the fifth time period $t_5$, the output stage of Frame 4 is processed on processor P2 and the application stage of Frame 5 is processed on processor P1.

Various other methods may be envisioned that segment frame processing into a number of processes operative on a number of different processing cores. Those skilled in the art will recognize that various other stages may be implemented. Complex applications may be segmented and performed on different processing cores. For example, a first processor may perform an input stage, a second processor may perform a first application stage, a third processor may perform a second application stage, etc.

Figure 7A:
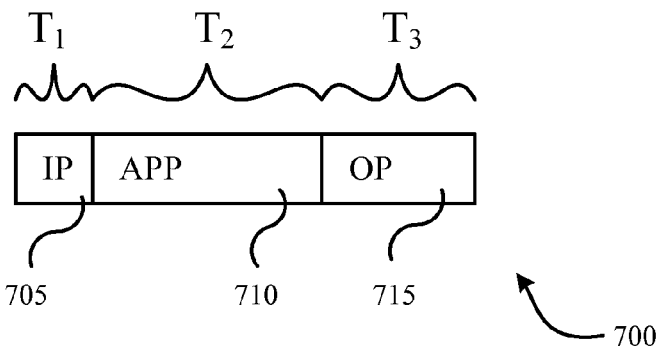
FIG. 7A shows a three stage data frame process with frame stages of varying lengths.
Figure 7B:
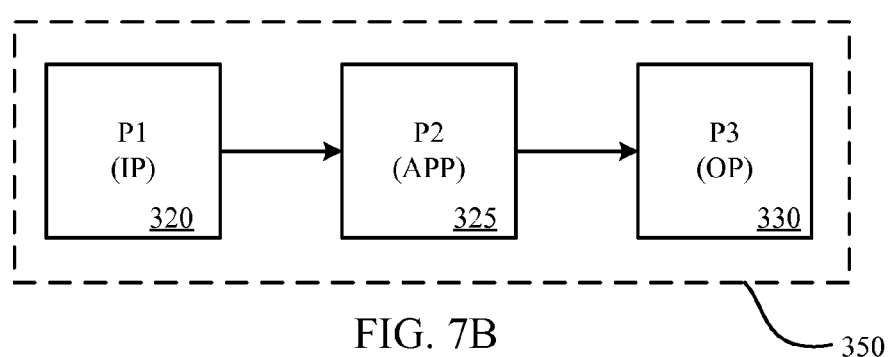
FIG. 7B shows the three stage data frame process of FIG. 7A pinned to three processing cores of a general purpose multi-core processor according to one embodiment.
Figure 7C:
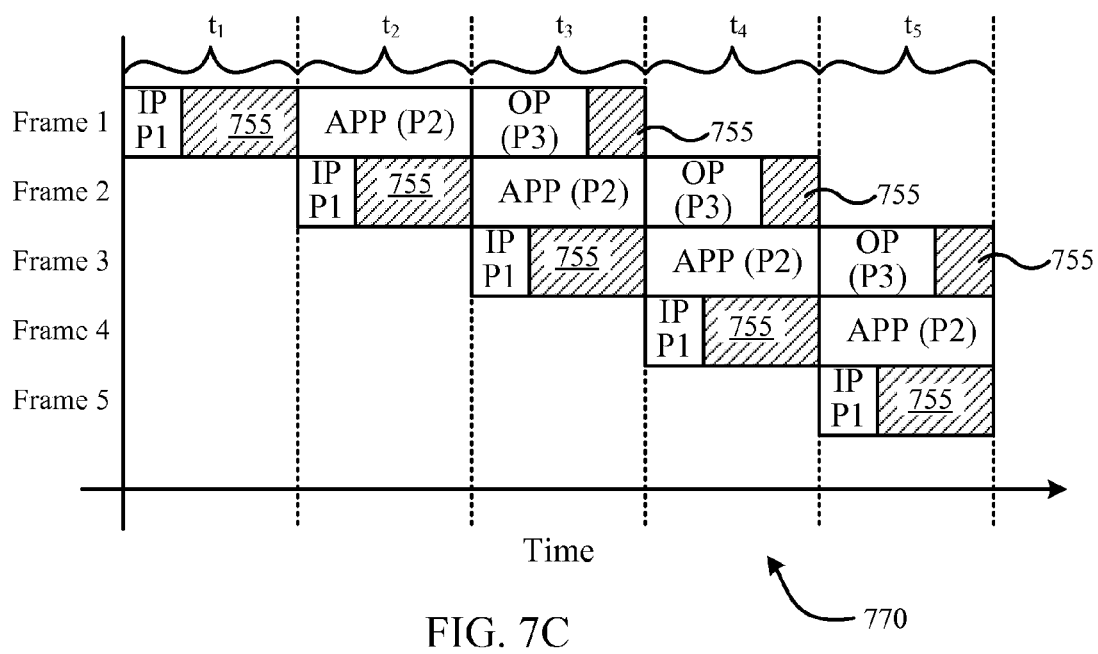
FIG. 7C shows a timing diagram of the three stage data frame process operating on multiple frames over time according to one embodiment.

In some embodiments of the invention, each stage may not take the same amount of processing time as shown in FIG. 7A. For example, using Gigabit Ethernet and small frame sizes, for example, 64 bytes, each frame may be processed on average in less than approximately 672 ns in order to maintain line rate processing. Not every stage will operate at approximately 672 ns. As shown in the stage frame processing diagram 700 of FIG. 7A, the input (IP) 705 processing stage is much shorter than the application (APP) 710 and output (OP) 715 processing stages. The processing may still occur in three different processing cores of a multi-core processor as shown in FIG. 7B. By segmenting frame processing into three stages and pinning the processing to independent processing cores of a multi-core processor, these three stages may be processed in parallel as shown in timing chart 770 in FIG. 7C. However, because the IP and OP stages are shorter than the APP stage, in some embodiments, processing overhead 755 may be added to the input or output stages in order to equalize the timing of the stages.

In some embodiments, a point-to-point communication mechanism may be employed that provides frame data between processes running on different processing cores. When stages operate in both kernel space and user space, a point-to-point communication mechanism may operate in shared memory. A shared memory location may allow processes operating in kernel space and user space to read and write frame data. The point-to-point communication mechanism may be a low latency mechanism such that the amount of time it takes for the processor to access the data is minimal. For example, frame data may be saved in the shared cache of a multi-core processor. For example, cache lines may be read from the shared memory into each processing core's processor cache as needed.

Figure 8:
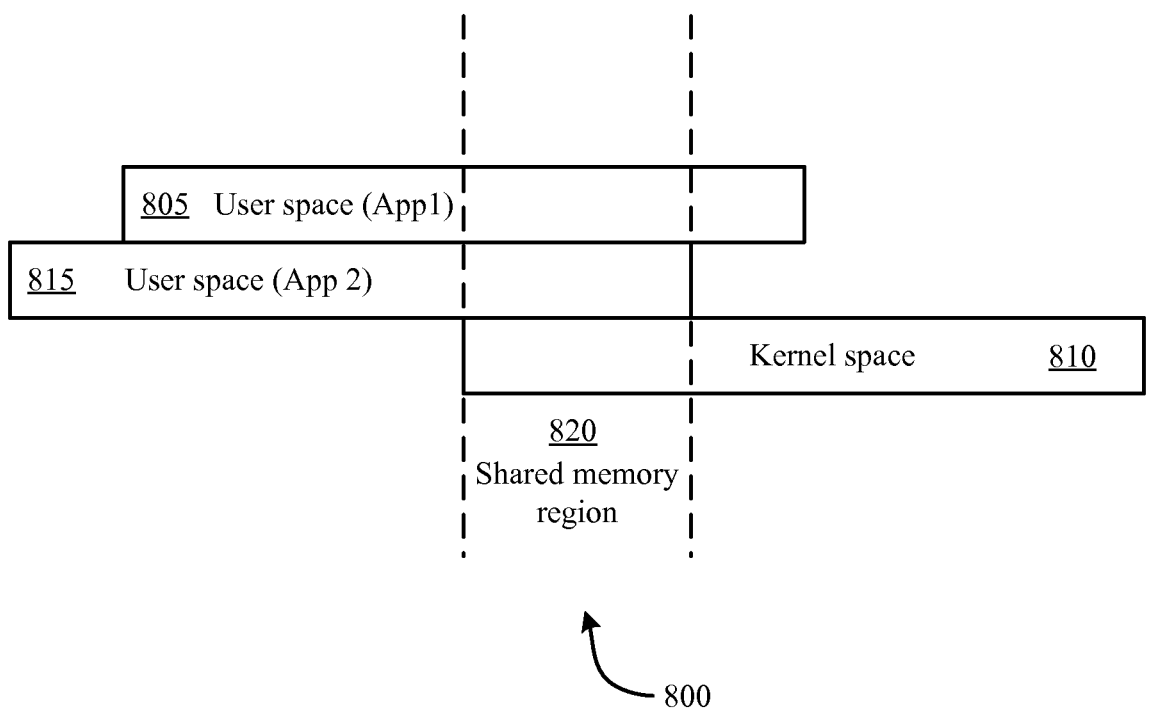
FIG. 8 shows an example of shared memory allocation that may be used as a part of a point-to-point queue, according to one embodiment.

Frames and/or frame data may be passed from one processing stage to the next processing stage using shared memory queues; for example, using one or more point-to-point queues. FIG. 8 shows an example of shared memory allocation 800 that may be used as a part of a point-to-point queue, according to one embodiment. Blocks 805 and 815 show user space memory allocations for two applications. Block 810 shows a kernel space memory allocation. A portion of each memory allocation overlaps in the shared memory region 820. Thus, both user space and kernel space applications may access data stored in this memory space.

Figure 9:
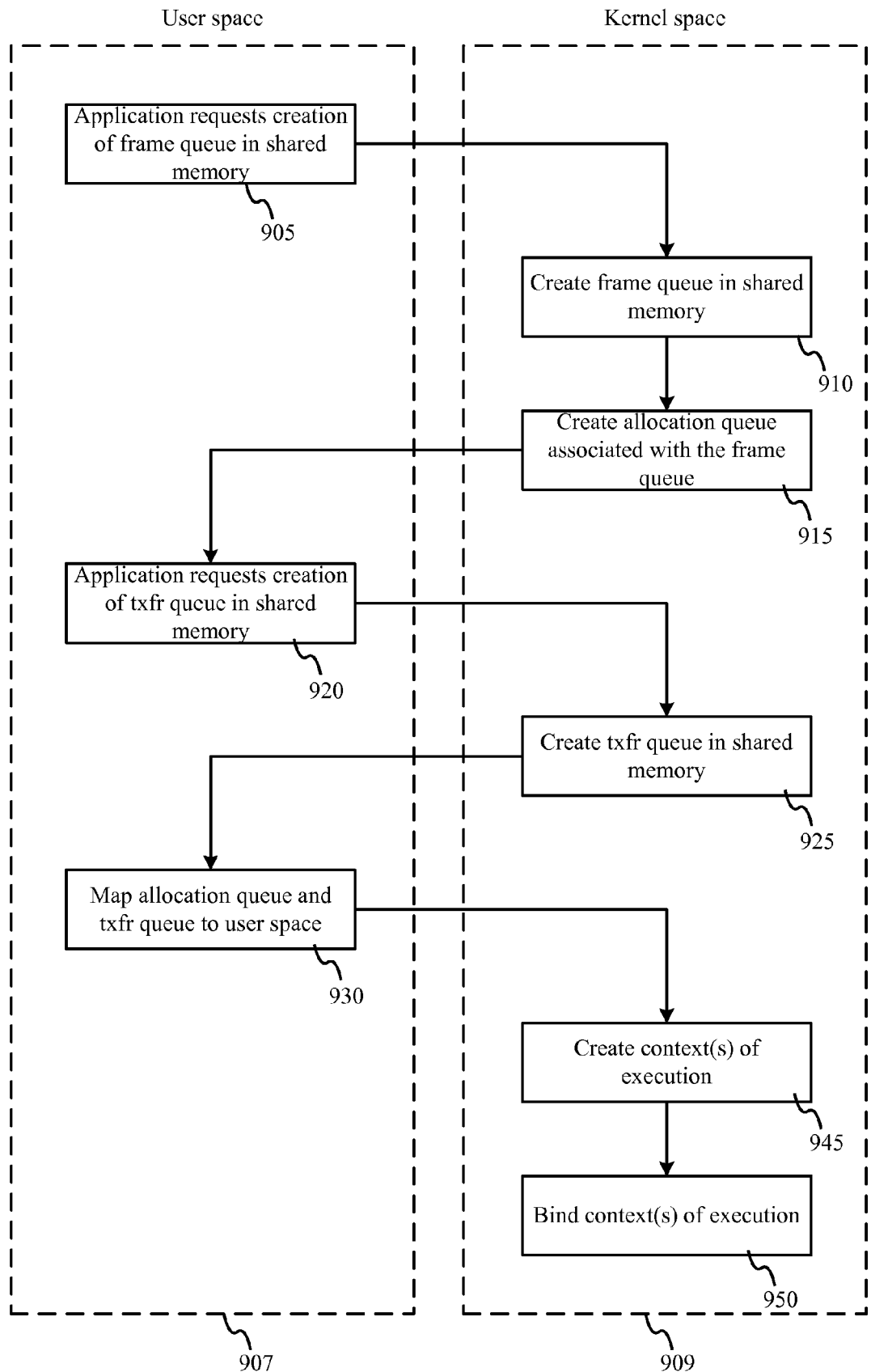
FIG. 9 shows a flowchart setting up a shared memory region for parallel processing according to one embodiment.

FIG. 9 shows a flowchart setting up a shared memory region for parallel processing according to one embodiment. The figure shows an example of blocks that occur in user space 907 and kernel space 909. In some embodiments, some blocks may be moved from user space to kernel space and vice versa. A frame queue is requested by an application in user space at block 905. The frame queue may hold, for example, data received from the network and/or data that is being prepared to send through the network. The kernel space then creates the frame queue at block 910 and then creates an allocation queue that contains the memory addresses for each memory location in the frame queue at block 915. A transfer queue, such as a point-to-point communication mechanism (see the up queue 225 and down queue 250 in FIGS. 2A-2C), may then be requested by the application at block 920. The transfer queue is then created in shared memory by the kernel at block 925. The allocation queue and the transfer queue may then be mapped to user space at block 930. This mapping may only require copying the memory addresses to user space. Contexts of execution, such as threads or processes, may then be created in the kernel at block 945. The contexts of execution may be bound to a specific processing core of a multi-core processor. In some cases, each context of execution may be bound to a single processing core of a multi-core processor.

Figure 10:
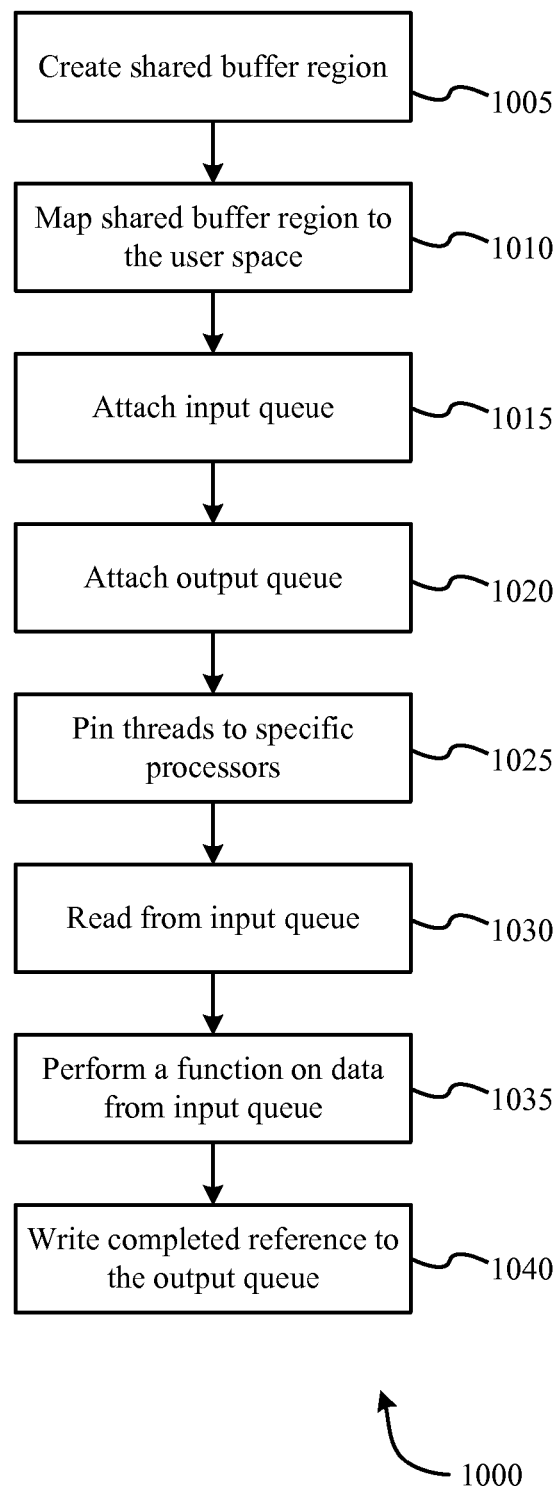
FIG. 10 shows another flowchart 1000 showing another embodiment of the invention.

FIG. 10 shows another flowchart 1000 showing another embodiment of the invention. Once a shared buffer region has been created as shown by block 1005 the shared buffer region may be mapped to the user space at block 1010. In one embodiment of the invention, the shared buffer region is mapped by copying pointers from kernel space to the user space. In such an embodiment, the applications running in user space may access the shared memory using a copy of the pointers as well as the operating system and/or device drivers in kernel space may access the shared memory using the pointers. Input and output queues are attached at blocks 1015 and 1020. The input and output queues may be part of the shared memory according to one embodiment. Threads may then be pinned to a specific processor at block 1025. In one embodiment, each stage may be pinned to a specific processor. For example, an input stage, an application stage, and/or an output stage may be pinned to separate processing cores of a multi-core processor.

Frame data may then be read from the input queue at block 1030 during the input stage on a first processing core 1030. An application may then perform one or more functions on the data during the application stage 1035, whereupon the resulting data from the application stage may be written into an output queue at block 1040.

Figure 11:
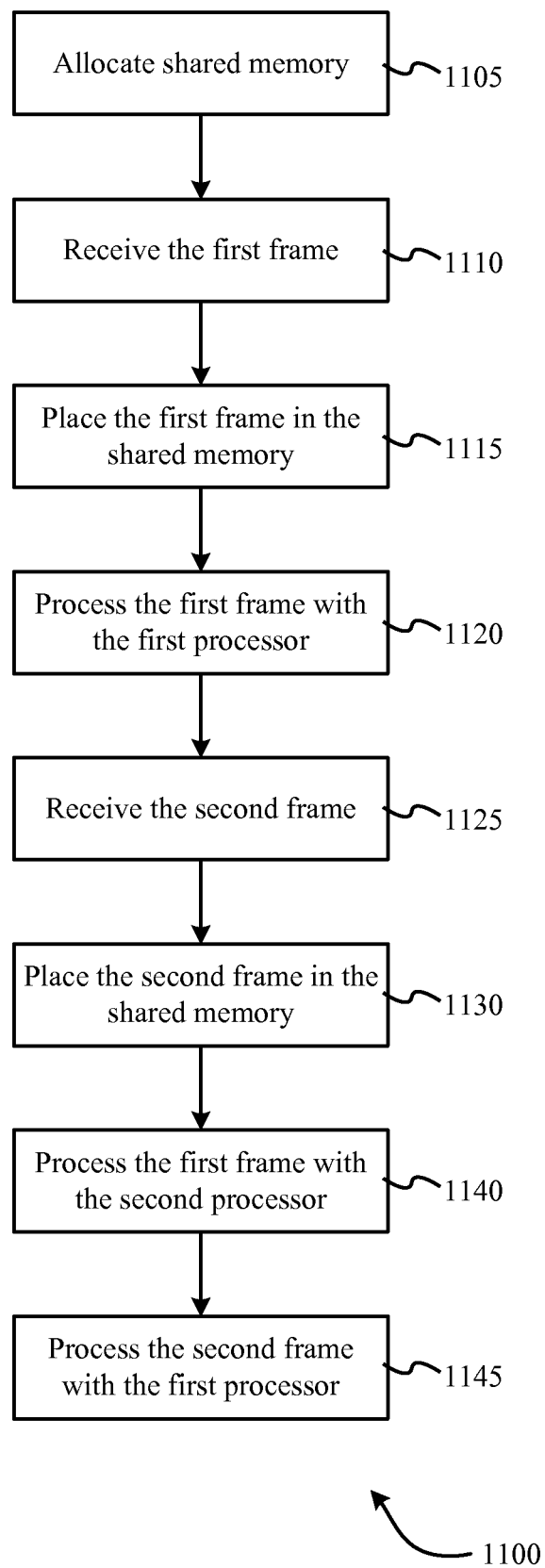
FIG. 11 shows a flow chart 1100 of a pipeline parallelism according to another embodiment.

FIG. 11 shows a flow chart 1100 of a pipeline parallelism according to another embodiment. Shared memory space is created and allocated at block 1105. For example, buffers in shared memory space may be accessible from both user and/or kernel space. These buffers may include the input queue, the output queue and/or an allocation buffer. A first frame is received at block 1110 and placed in shared memory at block 1115. The first frame is then processed by a first processing core of a multi-core processor at block 1120. Blocks 1110 and/or 1115, in some embodiments, may be part of the processing in block 1120. A second frame is received at block 1125 and placed in shared memory at block 1130. The first frame may then be processed by a second processing core of the multi-core processor at block 1140, while the second frame is processed by the first processing core of the multi-core processor at block 1145. The first and/or second processing core may operate any of various applications.

Figure 12:
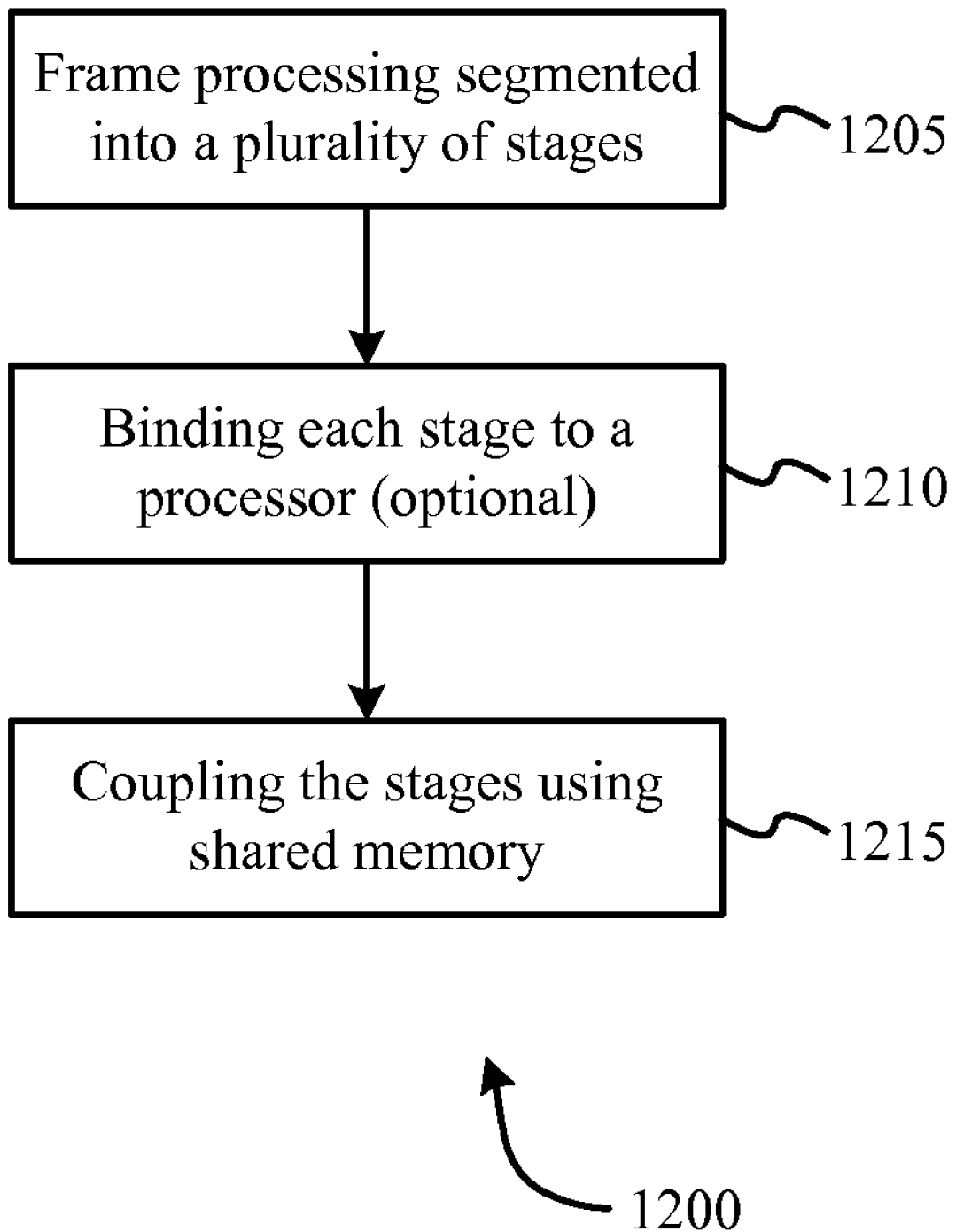
FIG. 12 shows a block diagram of a process for segmenting frame processing into stages operated by a number of processing cores according to one embodiment.

FIG. 12 shows a block diagram 1200 of a process for segmenting frame processing into stages operated by a number of processors according to one embodiment. Frame processing may be segmented into a plurality of stages at block 1205. Each stage may be a thread, process, application, context of execution, and/or schedulable unit. Any number of stages may be used. In some embodiments, the number of stages may be limited only by the number of processing cores available in a multi-core processor.

Optionally, each stage may then be bound or pinned to a specific processor at block 1210. Binding a stage with a processing core dedicates the processing core to the stage with which it is bound or pinned. Those skilled in the art will recognize various ways of binding and/or pinning a stage with a processing core.

The stages may then be coupled using shared memory at block 1215. Using shared memory allows stages in kernel space and user space to quickly and easily share frame data. Using shared memory may provide a low latency point-to-point communication mechanism that does so without copying the data from user space to kernel space or vice versa. Enqueuing and/or dequeuing embodiments described herein may be used to read and write data to a shared buffer from one stage to another stage. Any type of reading and/or writing techniques may be used to read or write data to the shared buffer.

Figure 13:
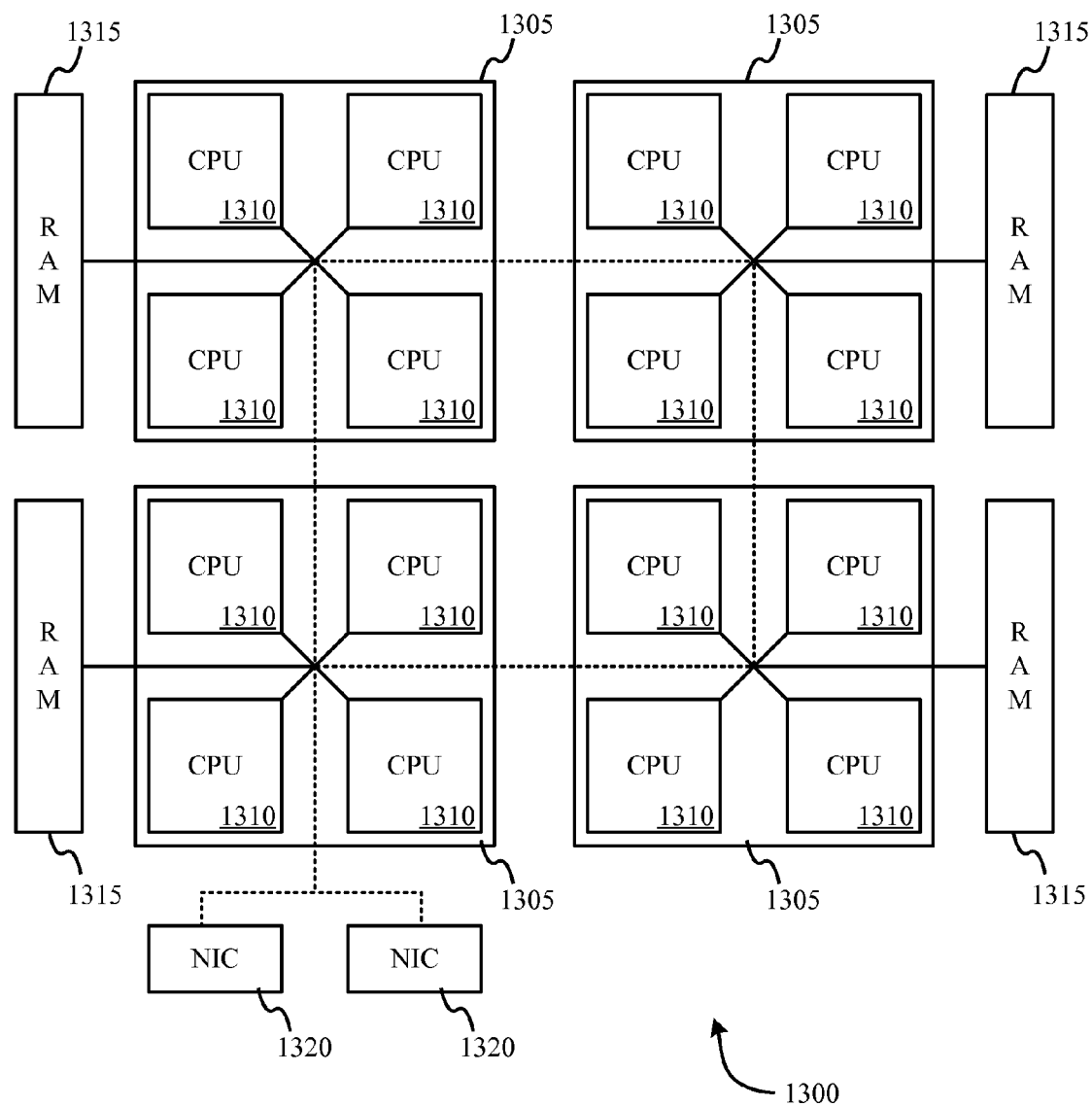
FIG. 13 shows a multi-core processor, which may be used in various embodiments.

FIG. 13 shows a multi-core processor 1300, which may be used in various embodiments. The multi-core processor 1300 is communicably linked with two network interface controllers (NIC) 1320. A single NIC may also be used. The multi-core processor as shown in the figure includes 16 processing cores 1310 arranged in four processing clusters 1305 that share random access memory (RAM) 1315.

Figure 14:
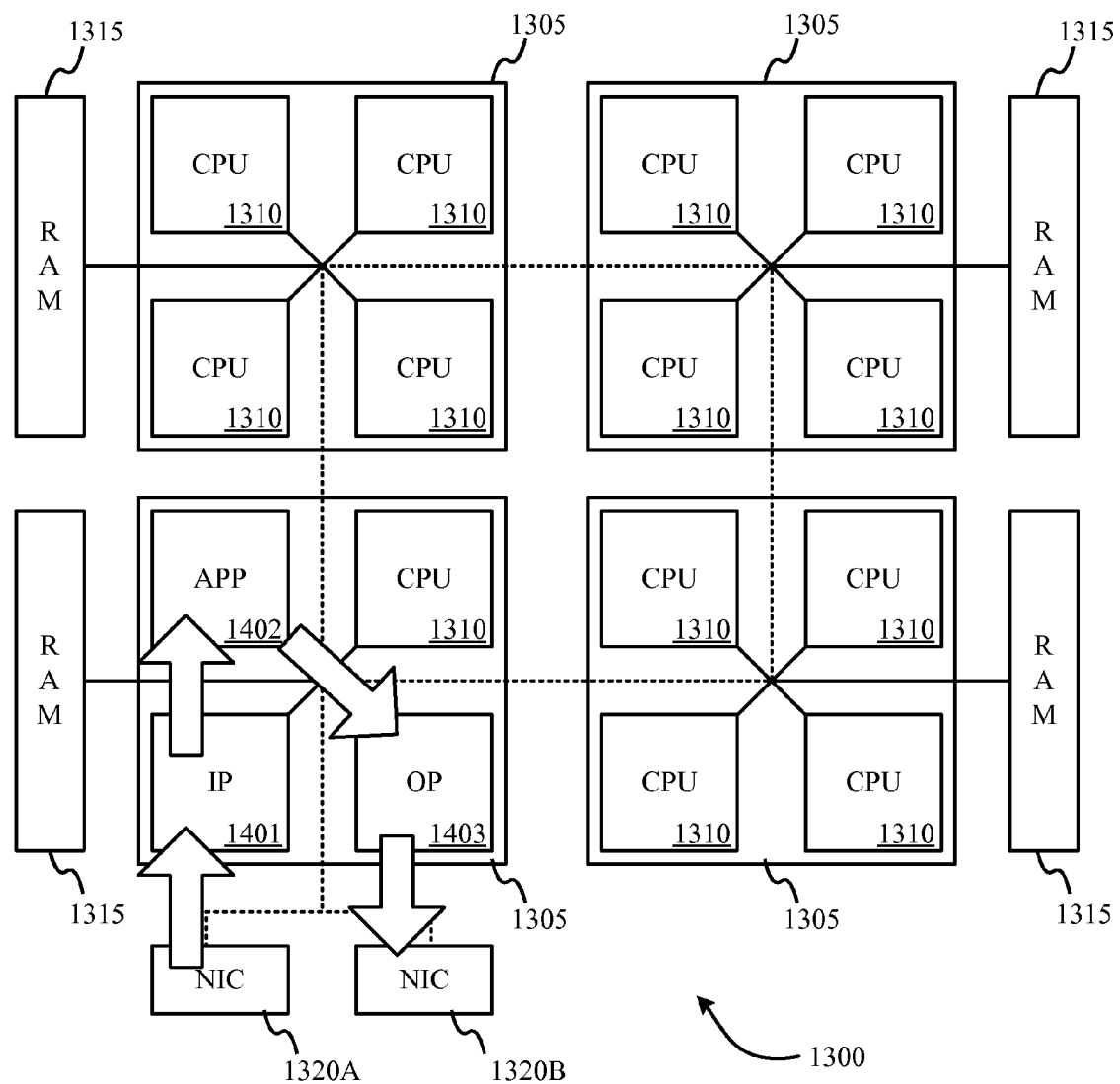
FIG. 14 shows a multi-core processor with three stages of frame processing pinned to three processing cores.
Figure 15:
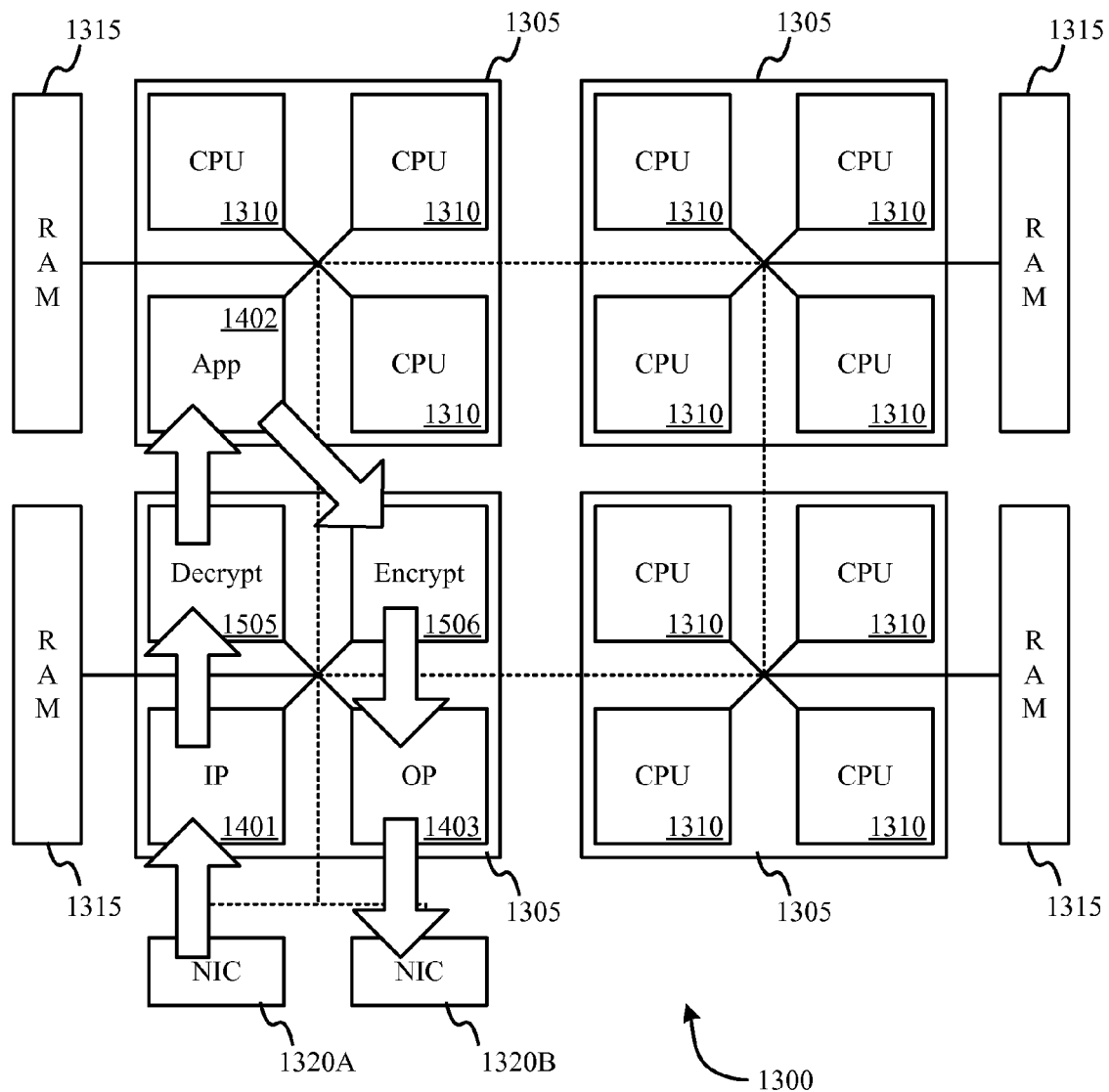
FIG. 15 shows another multi-core processor with five stages pinned with five processing cores according to another embodiment.

FIG. 14 shows a multi-core processor 1300 with three stages of frame processing pinned to three processing cores 1310. A first NIC 1320A may be controlled by a processing core 1401 bound to process an input stage. Accordingly, a frame is received through the NIC and input processing occurs at processing core 1401. For example, input processing, among other things, may place frame data in shared memory according to one embodiment. A second processing core 1402 may then provide application specific processing. A third processing core 1403 may then provide output processing prior to placing data on the network through the NIC 1320B. For example, output processing, among other things, may place frame data from shared memory onto the network according to one embodiment. FIG. 15 shows another multi-core processor 1300 with five stages pinned with five processing cores according to another embodiment. In this embodiment, decrypt and encrypt functions are also pinned to independent processors 1505 and 1506.

Figure 16A:
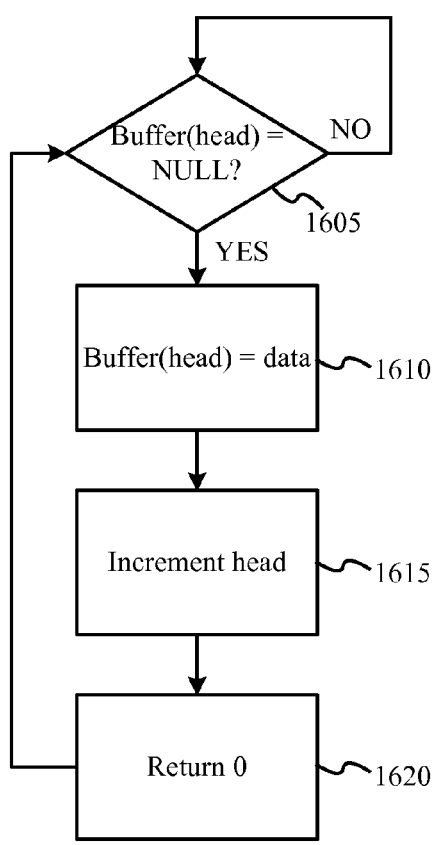
FIG. 16A shows a flowchart depicting a method for enqueuing data into a buffer using a single pointer according to one embodiment.

FIG. 16A shows a flowchart depicting a method for enqueuing data into a buffer using a single pointer according to one embodiment. This method and/or pseudo code may be used in an application programming interface (API) according to one embodiment. In other embodiments, it may be implemented in an operating system. This embodiment, for example, may be used as a point-to-point communication mechanism for sharing data between stages performed on different processing cores of a multi-core processor using, for example, shared memory. At block 1605, the method determines whether a head pointer points to a buffer location that equals "NULL." In this embodiment, "NULL" is used to show that a buffer location is empty; any other symbol may be used without limitation. If the buffer location pointed to by the head pointer does not equal "NULL," then method loops until it does. In some embodiments, the method may wait a set period of time before checking again. If the buffer location pointed to by the head pointer equals "NULL," then data may be written to this buffer location at block 1610. The head pointer may then be incremented at block 1615. In some embodiments, the function may then return a value stating the function was successful at block 1620. In other embodiments, as long as data is available and/or there is buffer space available, the method may simply repeat itself.

Figure 16B:
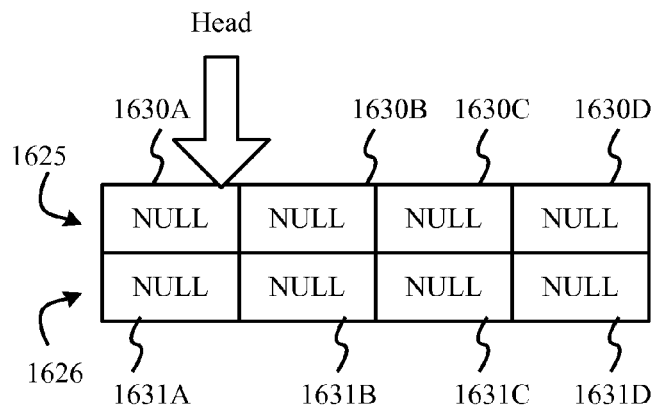
FIGS. 16B-16D show the operation of a head pointer on two cache lines according to one embodiment.
Figure 16C:
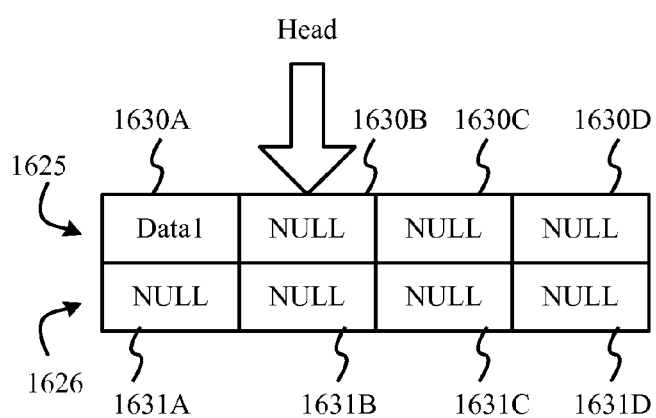

FIG. 16B shows two cache lines 1625 and 1626 of an empty buffer. Each cache line in this embodiment includes four memory locations for a total of eight cache lines 1630A, 1630B, 1630C, 1630D, 1631A, 1631B, 1631C, and 1631D. Each of the memory locations contains the empty symbol "NULL." FIG. 16C shows the head pointer 1640 pointing to memory location 1630B in the first cache line 1625, which contains "NULL." Accordingly, by following the flowchart described in FIG. 16A, "Data1" was written into the memory location 1630A as can be seen by comparing FIGS. 16B and 16C. The head pointer now points to memory location 1630B. The head pointer will continue to move through each memory location until there is no more data to enter and/or until the head pointer reaches a memory location with data as shown in FIG. 16D.

Figure 16D:
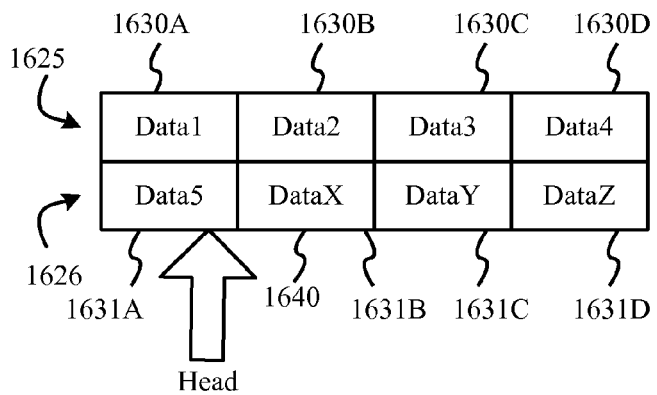

FIG. 16D shows that "Data2" was written into memory location 1630B. The head pointer 1640 increments and then points to 1630C and so forth. Following the flowchart in FIG. 16A, data will be written to each memory location in FIG. 16B that contains "NULL." That is, memory locations 1630B, 1630C, 1630D, and 1631A will have data written therein as shown in FIG. 16D. Returning to FIG. 16C, once the head pointer 1640 is incremented to point to memory location 1631B containing "DataX," the flowchart in FIG. 16A loops at block 1605 until the memory location 1631B in FIG. 16B includes "NULL." Thus, as shown in FIG. 16D, the head pointer remains at memory location 1631B.

FIG. 17A shows a flowchart depicting a method for enqueuing data into a buffer using both a head and a tail pointer according to some prior art techniques. In such methods, the head pointer is compared with the tail pointer to determine whether to write data. As shown in FIGS. 17B-17D, data is written until the head pointer reaches the tail pointer. One of the problems with methods that use both the head and the tail pointer to write data into a buffer is that a processes which uses the tail pointer to read data from the buffer must share the tail pointer. In such cases, the overhead required to share the two pointers may not be insignificant. Thus, such methods may have a high latency.

Figure 18A:
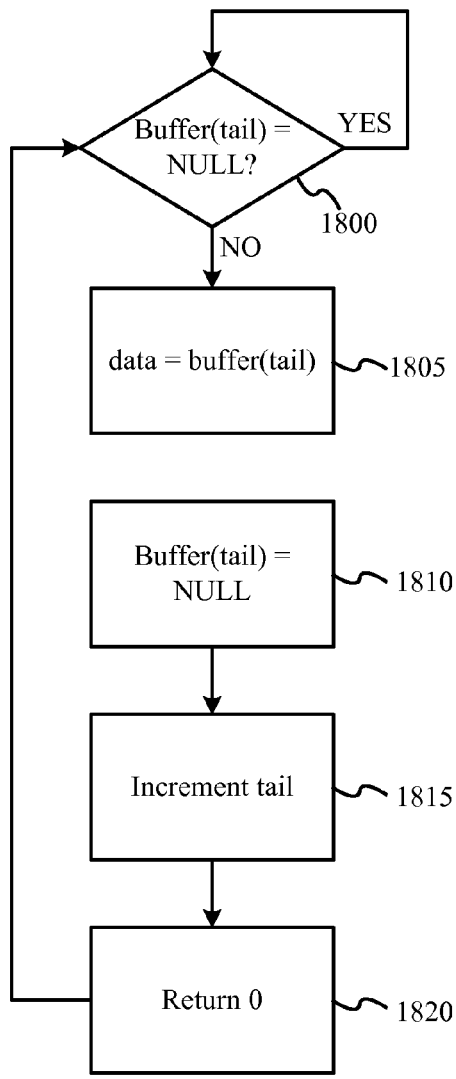
FIG. 18A shows a flowchart depicting a method for dequeuing data from a buffer using a single pointer according to one embodiment.

FIG. 18A shows a flowchart depicting a method for dequeuing data from a buffer using a single pointer according to embodiments. This method and/or pseudo code may be used in an application programming interface (API) according to one embodiment. In other embodiments, it may be implemented in an operating system. This embodiment, for example, may be used as part of a point-to-point communication mechanism for sharing data between stages performed on different processing cores of a multi-core processor using, for example, shared memory. At block 1800, the method determines whether the memory location pointed to by the tail pointer equals "NULL." In this embodiment, "NULL" is used to show that a buffer location is empty; any other symbol may be used without limitation. If the memory location pointed to by the tail pointer does equal "NULL," then method loops until it does not equal "NULL." In some embodiments, the method may wait a set period of time before checking again. If the memory location pointed to by the tail pointer does not equal "NULL," then the data in the memory location pointed to by the tail pointer is read from the memory location pointed to by the tail pointer at block 1805. The memory location pointed to by the tail pointer is then set to "NULL" at block 1810. The tail pointer is incremented at block 1815. In some embodiments, the function may then return a value stating the function was successful at block 1820. In other embodiments, as long as data is available and/or there is buffer space available, the method may simply repeat itself.

Figure 18B:
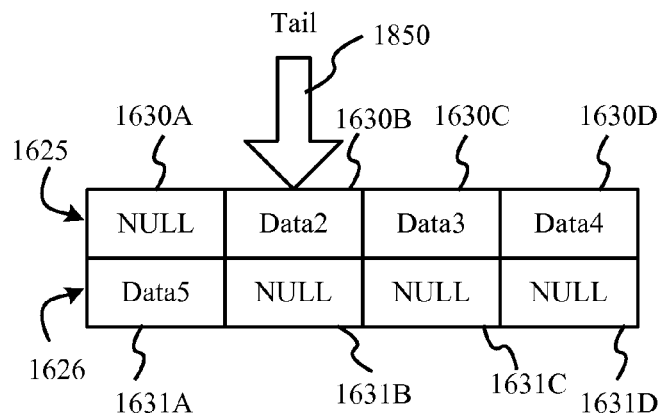
FIGS. 18B-18C show the operation of a tail pointer on two cache lines according to one embodiment.
Figure 18C:
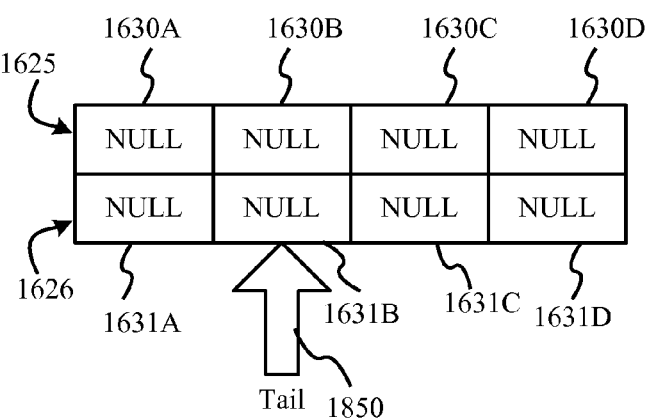

FIG. 18B shows two cache lines 1625 and 1626 of a buffer. Each cache line in this embodiment, includes four memory locations for a total of eight memory locations 1630A, 1630B, 1630C, 1630D, 1631A, 1631B, 1631C, 1631D. The tail pointer 1850 points to memory location 1630B in the first cache line 1625, which contains "Data2." Accordingly, following the flowchart described in FIG. 18A, the memory location pointed to by the tail pointer 1850 does not equal "NULL." Therefore, "Data2" is read from the memory location and then the memory location is set to "NULL." The method repeats itself moving from memory location to memory location until a memory location equals "NULL" as shown by memory location 1631B in FIG. 18C. According to one embodiment, data may be written to a buffer using the method shown in FIG. 16A and read from a buffer using the method shown in FIG. 18A. In such an embodiment, the two methods may act independent from one another. Such independence may allow each method to operate without first accessing the tail and/or the head pointer that was used by the other processes.

Figure 19A:
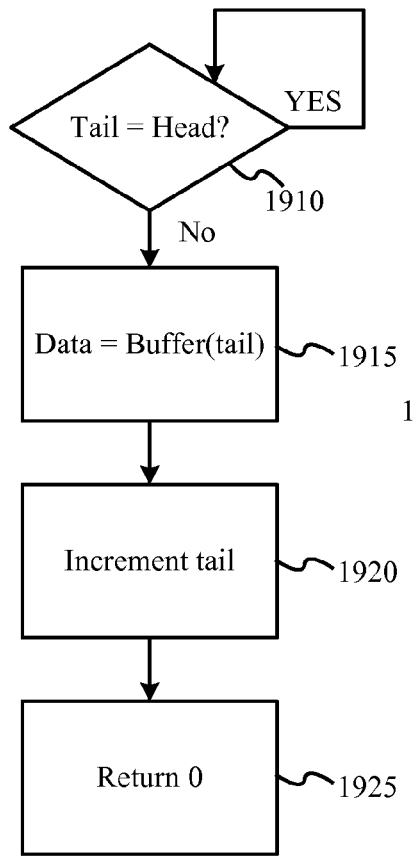
FIG. 19A shows a flowchart depicting a method for dequeuing data from a buffer using a head and a tail pointer according to one embodiment.
Figure 19B:
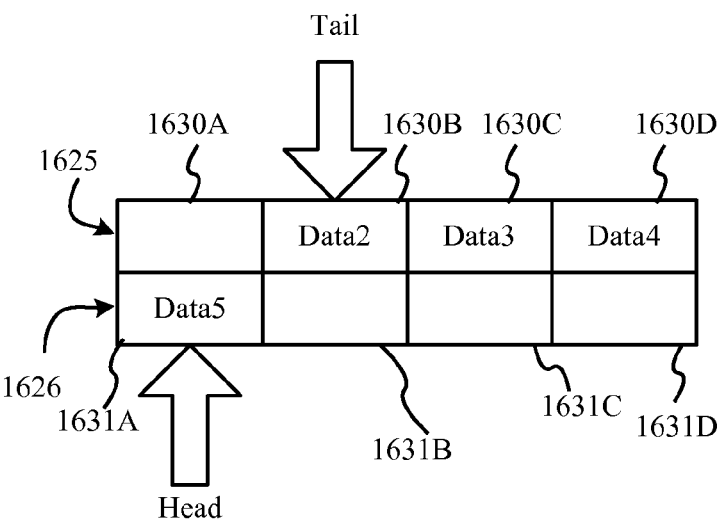
FIGS. 19B-19C show the operation of a head and a tail pointer on two cache lines according to one embodiment.
Figure 19C:
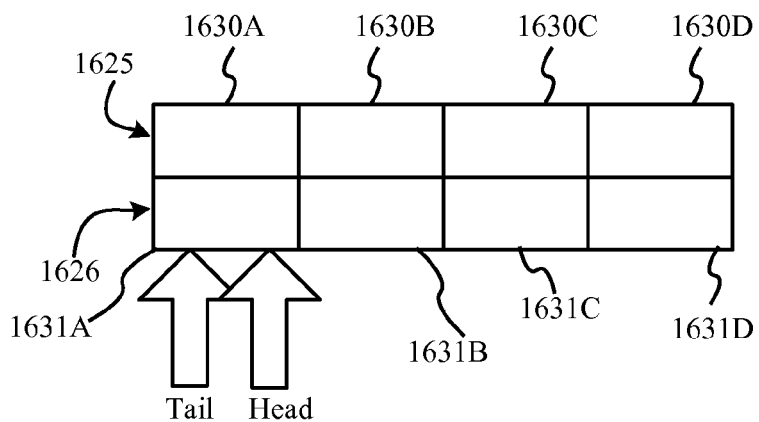

FIG. 19A shows a flowchart depicting a method for dequeuing data from a buffer using both a head and a tail pointer according to some prior art techniques. In such methods, the tail pointer is compared with the head pointer to determine whether to read data. As shown in FIGS. 19B-19C, data is read until the tail pointer reaches the head pointer. One of the problems with methods that use both the head and the tail pointer to read data from a buffer is that a processes which uses the head pointer to write data to the buffer must share the head pointer, for example, with the method shown in FIG. 17A. In such cases, the overhead required to share the two pointers may not be insignificant. Thus, such methods may have a high latency.

Figure 20A:
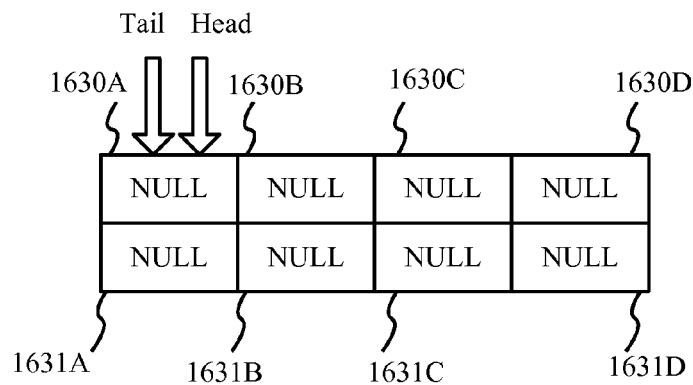
FIGS. 20A-20I show the operation of a head and a tail pointer working independently on two cache lines according to one embodiment.
Figure 20B:
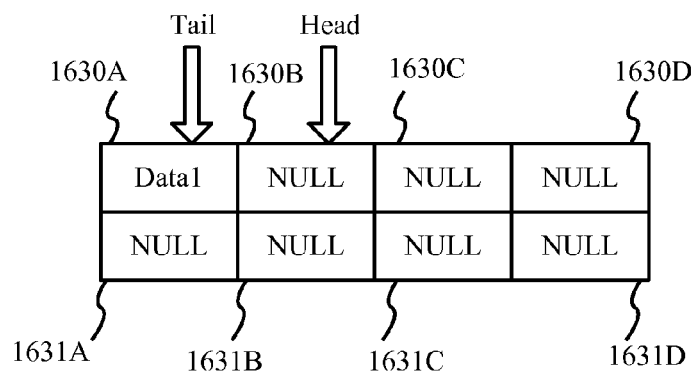
Figure 20C:
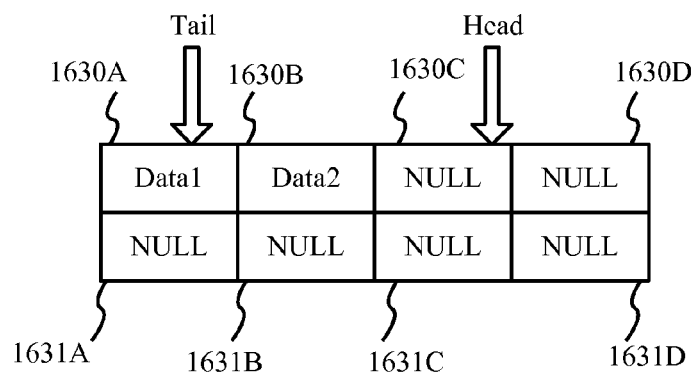
Figure 20D:
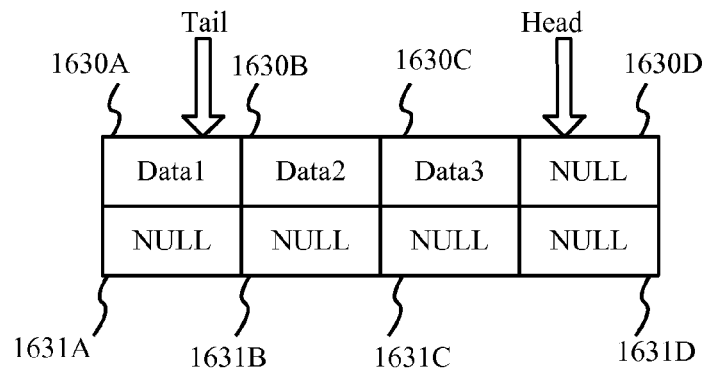

FIGS. 20A-20I show the interaction of head and tail pointers according to one embodiment. In FIG. 20A, the cache line is in the base state. Both the head and the tail pointers point to the first memory location 1630A. FIG. 20B shows the beginning of data being written into memory. "Data1" is written into memory location 1630A and the head pointer is incremented and now points at memory location 1630B. FIG. 20C shows "Data2" written into memory location 1630B and the head pointer is incremented and now points at memory location 1630C. FIG. 20D shows "Data3" written into memory location 1630C and the head pointer is incremented and now points at memory location 1630D.

Figure 20E:
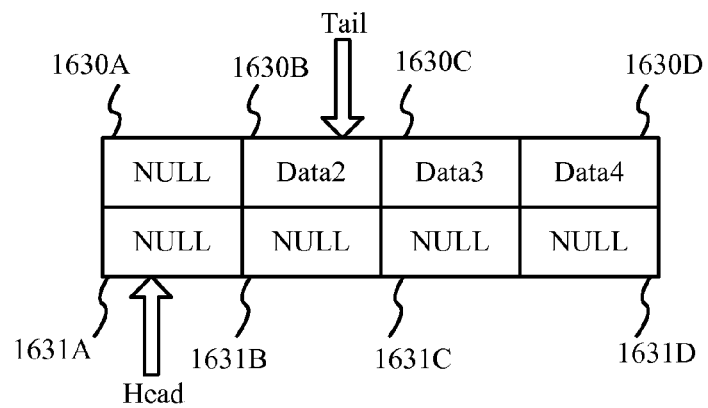
Figure 20F:
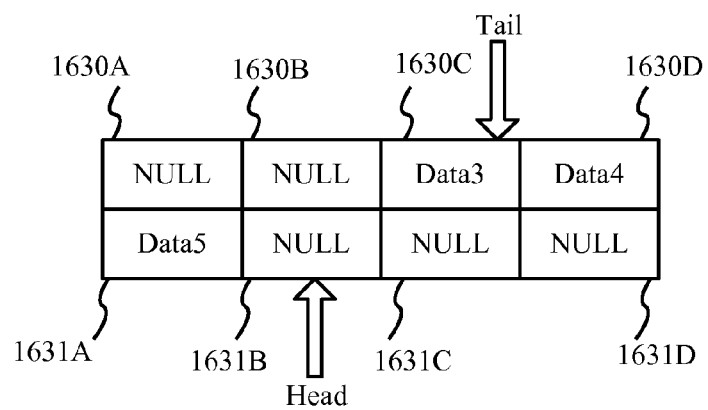
Figure 20G:
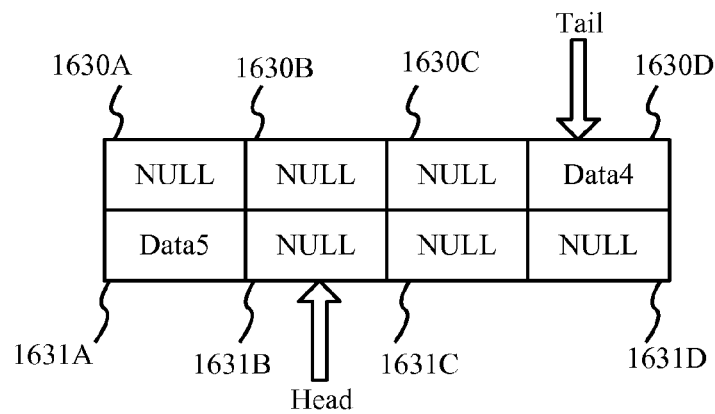
Figure 20H:
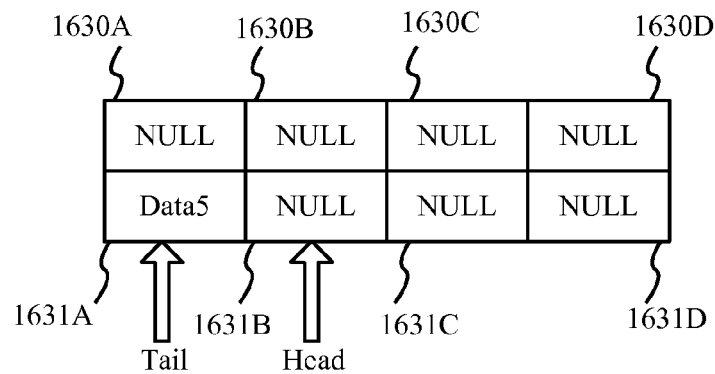
Figure 20I:
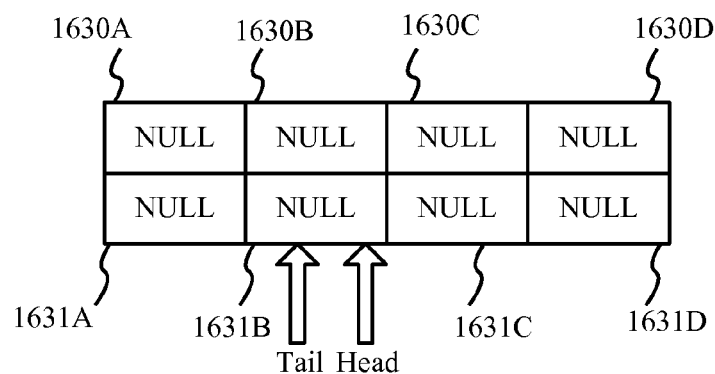

At this point of the example, the dequeue function begins to read data from the cache line as shown in FIG. 20E. "Data1" is read from memory location 1630A and the tail pointer is incremented. During the same time period, "Data4" has been written into memory location 1630D and the head is incremented to point to 1631A. FIG. 20F shows "Data5" written to memory location 1631A and the head pointer incremented to point to 1631B. Meanwhile, the tail pointer now points to memory location 1630C and memory locations 1630A and 1630B have been filled with "NULL." FIG. 20G shows "Data3" having been read from memory location 1630C. FIG. 20H shows "Data4" having been read from memory location 1630D. FIG. 20I shows the tail pointer caught up with the head pointer. "Data5" has since been read from the buffer. NULL has been written into each memory location where data has been read.

In some embodiments, the head and tail pointers are designed to never meet at the same memory location. Thus, somewhere before tail pointer gets near the head pointer, a slip or delay in the dequeue function is implemented to allow the head pointer to move along.

Figure 21:
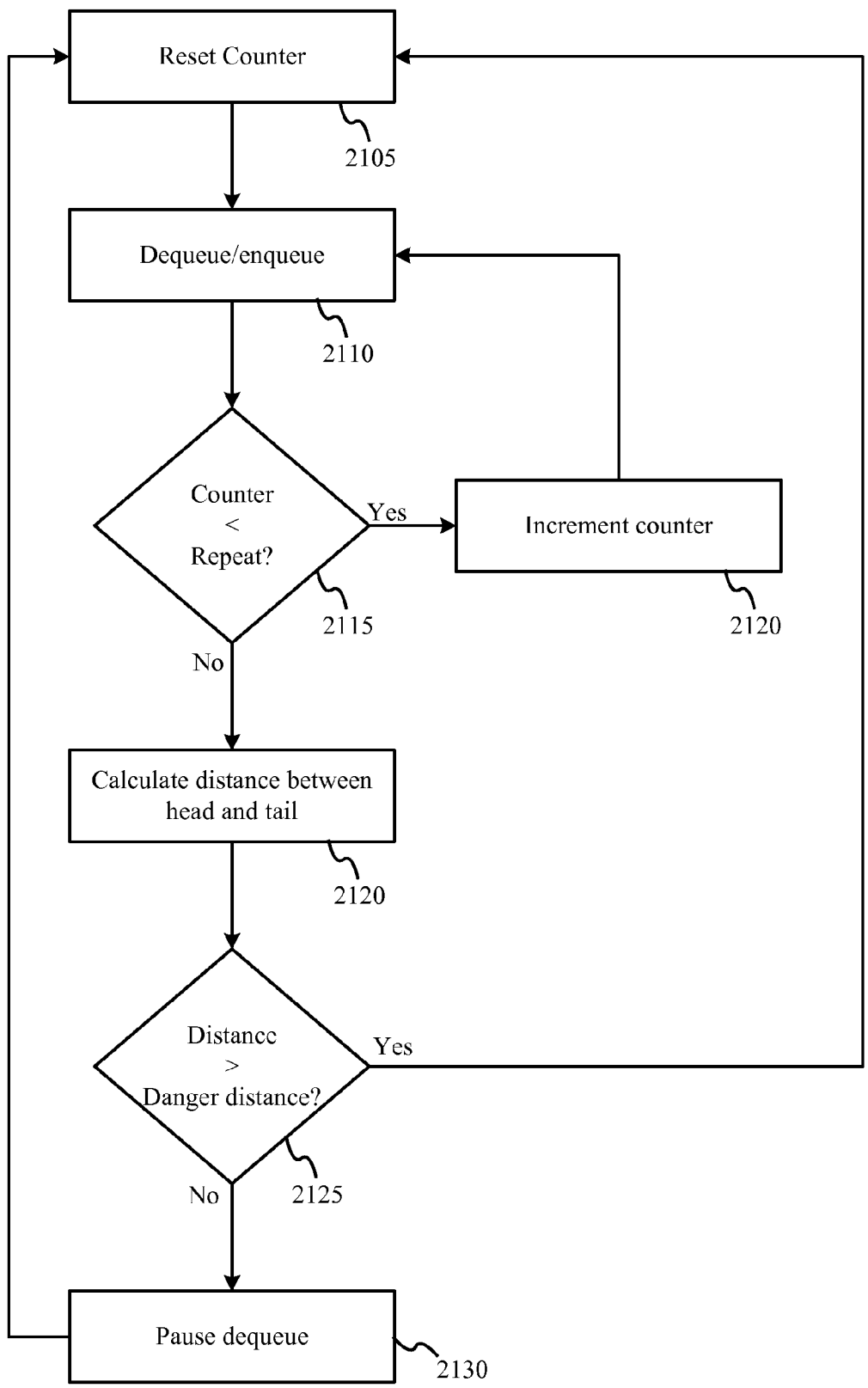
FIG. 21 shows an example of providing slip between the head and a tail pointer according to one embodiment.

In some instances, a head and a tail pointer for enqueuing and dequeuing data to and/or from a buffer as described in relation to FIGS. 16, 18 and 20, come close to one another. For example, the tail pointer may read data faster than the head pointer writes the data to the buffer. In such cases, a slip between the two pointers may be implemented as shown in FIG. 21. At the start of the method a counter is reset at block 2105. Following which a dequeue and/or an enqueue operation is performed at block 2110. The counter is then compared with a repeat value at block 2115. The repeat value may comprise any value. The value may be machine specific or application specific. If the counter is less than the repeat value then the counter is incremented at block 2120. Following which another enqueue and/or dequeue operation occurs at block 2110.

The distance between the head pointer and the tail pointer may then be calculated at block 2115. For example, the distance may be calculated from the number of memory locations between the two pointers and/or the number of cache lines between the two pointers. In another embodiment the distance may be a measure of the number of entries in the buffer, or a measure of the number of empty memory locations in the buffer. Various other schemes for calculating the distance between the head and tail pointer may used. At block 2125, it may be determined whether the distance between the head and tail pointers is greater than a danger distance. The danger distance, for example, may be calculated dynamically based on the performance of the enqueuing and dequeuing. In other embodiments, the danger distance may be a set figure, for example, the danger distance may be 2 or more cache lines. If the distance between the tail and head pointers is greater than the danger distance, then the system returns to block 2105 where the counter is reset. If the distance between the head and tail pointer is less than the danger distance dequeuing is paused at block 2130. The dequeue may be paused a number of frames, a time period, a number of iterations or a number of cache lines processed by the head pointer according to one embodiment. The dequeue may also be paused according to a set figure or on a figure that depends on the distance calculated between the head and tail pointer.

The enqueue and dequeue operations, as described above in regard to FIGS. 16 and 18, may be applied in different and/or independent address spaces, for example, kernel space, user space, and/or shared memory. The enqueue and/or dequeue functionality may be fully decoupled and/or concurrent. Moreover, the enqueue and dequeue functions may be used to share data between processors when implementing pipeline-parallel processing as described above or data parallelism.

Figure 22A:
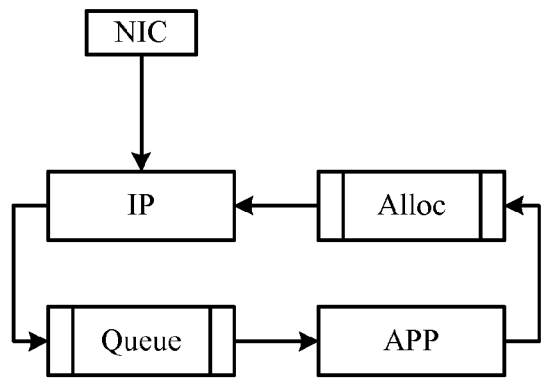
FIGS. 22A-22C show the process flow of three embodiments of the invention.

FIG. 22A shows a segmented two-stage process according to one embodiment. A single NIC provides data to an input stage that then passes the data to the APP stage through a queue. The data allocation queue returns the memory addresses once the APP stage has been completed.

Figure 22B:
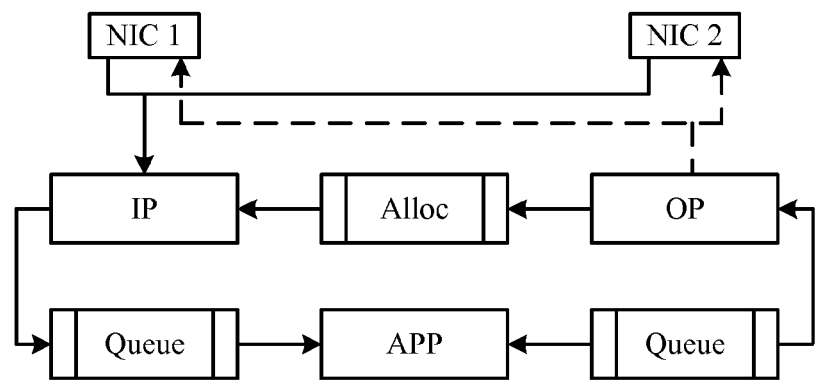
Figure 22C:
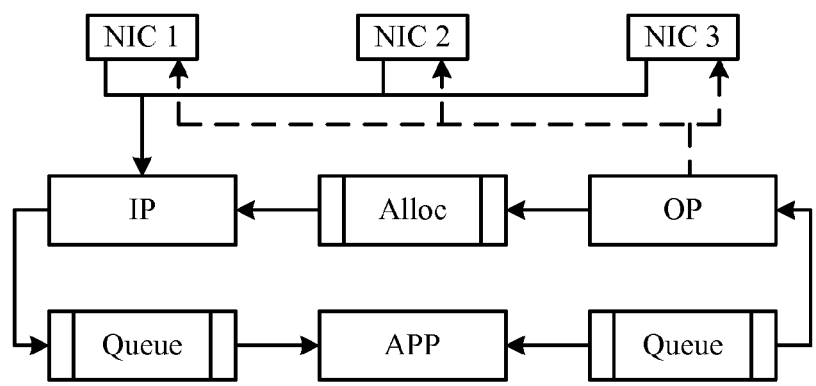

FIGS. 22B-22C show segmented three-stage processes according to embodiments. Each uses more than one NIC. Data may be sent and/or received from any of the NICs. The three stages include input, output and processing.

It is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figures. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein, the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the principles of the disclosure have been described above in connection with specific apparatuses and methods, it is to be clearly understood that this description is made only by way of example and not as limitation on the scope of the disclosure.

What is claimed is:

1. A method comprising:
pointing a head pointer to an oldest empty memory location in a set of the most recent memory entries of a general purpose multi-core processor where data was enqueued;
pointing a tail pointer to the oldest memory location in the set of most recent entries where data was enqueued;
determining whether a first memory location pointed to by the head pointer includes an empty symbol; and
if the first memory location includes the empty symbol, placing data in the first memory location and incrementing the head pointer.

2. The method according to claim 1, further comprising:
identifying a distance between the head pointer and the tail pointer;
determining that the distance between the head pointer and the tail pointer is less than a threshold distance; and
pausing dequeue based on the determination.

3. The method according to claim 2, wherein the dequeue is paused for a number of frames, a time period, a number of iterations, or a number of cache lines.

4. The method according to claim 3, wherein a length of the dequeue pause is based on the identified distance between the head pointer and the tail pointer.

5. The method according to claim 1, wherein the empty symbol comprises: the NULL pointer.

6. The method according to claim 1, further comprising:
determining whether a second memory location includes the empty symbol; and
placing data in the second memory location if the second memory location includes the empty symbol.

7. The method according to claim 1, wherein if the first memory location includes the empty symbol, the incrementing comprises incrementing the head pointer to point to a second memory location after placing data in the first memory location.

8. A method comprising:
pointing a head pointer to an oldest memory location in a set of the most recent memory entries of a general purpose multi-core processor where data was enqueued;
pointing a tail pointer to the oldest memory location in the set of most recent entries where data was enqueued;
determining whether a first memory location pointed to by tail pointer includes the empty symbol;
reading data from the first memory location, if the first memory location does not include the empty symbol; and
if the first memory location does not include the empty symbol, placing the empty symbol in the first memory location.

9. The method according to claim 8, further comprising:
determining whether a second memory location includes the empty symbol;
reading data from the second memory location, if the second memory location does not include the empty symbol; and
placing the empty symbol in the second memory location, if the second memory location does not include the empty symbol.

10. The method according to claim 8, wherein the empty symbol comprises the NULL pointer.

11. The method according to claim 8, wherein if the first memory location does not include the empty symbol, the incrementing comprises incrementing the tail pointer to point to a second memory location after reading data from the first memory location.

12. A method comprising:
pointing a head pointer to the oldest empty memory location in a set of the most recent memory entries of a general purpose multi-core processor where data was enqueued;
pointing a tail pointer to the oldest memory location in the set of most recent entries where data was enqueued;
determining whether the memory location pointed to by the head pointer is empty;
if the memory location pointed to by the head pointer is empty, placing data in the memory location pointed to by the head pointer; and
incrementing the head pointer.

13. The method according to claim 12, further comprising:
storing the head pointer in a memory location in a first cache line of the general purpose multi-core processor; and
storing the tail pointer in a memory location in a second cache line, wherein the first cache line and the second cache line comprise different cache lines.

14. The method according to claim 12, wherein the determining whether the memory location pointed to by the head pointer is empty comprises determining whether the head pointer equals NULL.

15. The method according to claim 12, wherein the determining whether the memory location pointed to by the head pointer is empty further comprises determining whether the memory location pointed to by the head pointer equals an empty symbol.

16. The method according to claim 12, further comprising:
calculating a first distance between the head pointer and the tail pointer;
determining whether the first distance between the head pointer and the tail pointer is less than a threshold distance; and
if the first distance between the head pointer and the tail pointer is less than the threshold distance, pausing at least one of dequeue and enqueue.

17. The method according to claim 16, further comprising:
if the first distance between the head pointer and the tail pointer is less than the threshold distance, waiting a period of time;
calculating a second distance between the head pointer and the tail pointer after the period of time;
determining whether the second distance between the head pointer and the tail pointer is less than the threshold distance; and
if the second distance between the head pointer and the tail pointer is less than the offset, pausing at least one of dequeue and enqueue.

18. A method comprising:
pointing a head pointer to the oldest empty memory location in a set of the most recent memory entries of a general purpose multi-core processor where data was enqueued;
pointing a tail pointer to the oldest memory location in the set of most recent entries where data was enqueued;
determining whether the memory location pointed to by tail pointer is empty;

if the memory location pointed to by the tail pointer is not empty, reading the data pointed to by the tail pointer;

setting the memory location pointed to by the tail pointer equal to the empty symbol; and incrementing the tail pointer.

19. The method according to claim 18, further comprising:

storing the head pointer in a memory location in a first cache line of the general purpose multi-core processor; and storing the tail pointer in a memory location in a second cache line, wherein the first cache line and the second cache line comprise different cache lines.

20. The method according to claim 18, wherein the determining whether the memory location pointed to by the tail pointer is empty comprises determining whether the tail pointer equals NULL.

21. The method according to claim 18, further comprising:

calculating the distance between the head pointer and the tail pointer;

determining whether the distance between the head pointer and the tail pointer is less than a threshold distance; and if the distance between the head pointer and the tail pointer is less than the threshold distance, pausing a dequeuing operation.

* * * * *

UNITED STATES PATENT AND TRADEMARK OFFICE
CERTIFICATE OF CORRECTION

| | | |
|---|---|---|
| PATENT NO. | : 8,112,594 B2 | Page 1 of 1 |
| APPLICATION NO. | : 12/106712 | |
| DATED | : February 7, 2012 | |
| INVENTOR(S) | : Giacomoni et al. | |

It is certified that error appears in the above-identified patent and that said Letters Patent is hereby corrected as shown below:

In claim 8, column 17, line 44, delete "oldest memory", and insert --oldest empty memory--.

Signed and Sealed this
Fourteenth Day of August, 2012

David J. Kappos
*Director of the United States Patent and Trademark Office*